United States Patent
Beecham et al.

(10) Patent No.: US 12,273,348 B2
(45) Date of Patent: Apr. 8, 2025

(54) SECURITY DRIVER EXTERNAL FUNCTIONS

(71) Applicant: ALTR Solutions, Inc., Austin, TX (US)

(72) Inventors: James Douglas Beecham, Austin, FL (US); Christopher Edward Struttmann, Indialantic, FL (US); Mark Snellman, Orlando, FL (US); Judson Benton Locke, Indialantic, FL (US); Kevin Rose, Viera, FL (US)

(73) Assignee: ALTR Solutions, Inc., Austin, TX (US)

( * ) Notice: Subject to any disclaimer, the term of this patent is extended or adjusted under 35 U.S.C. 154(b) by 221 days.

(21) Appl. No.: 17/845,904

(22) Filed: Jun. 21, 2022

(65) Prior Publication Data
US 2022/0407861 A1     Dec. 22, 2022

Related U.S. Application Data

(60) Provisional application No. 63/212,599, filed on Jun. 18, 2021.

(51) Int. Cl.
| | | |
|---|---|---|
| G06F 21/00 | (2013.01) | |
| G06F 21/62 | (2013.01) | |
| H04L 9/40 | (2022.01) | |

(52) U.S. Cl.
CPC ........ H04L 63/102 (2013.01); G06F 21/6227 (2013.01); H04L 63/0876 (2013.01); H04L 63/20 (2013.01)

(58) Field of Classification Search
CPC ............... H04L 63/102; H04L 63/0876; H04L 63/20; H04L 2463/082; H04L 63/08; G06F 21/6227; G06F 21/6245
See application file for complete search history.

(56) References Cited

U.S. PATENT DOCUMENTS

| | | | |
|---|---|---|---|
| 7,185,192 B1 * | 2/2007 | Kahn | G06F 21/6218 707/999.102 |
| 2008/0168037 A1 | 7/2008 | Kapadia et al. | |

(Continued)

FOREIGN PATENT DOCUMENTS

KR    10-2013-0101587 A    9/2013

OTHER PUBLICATIONS

International Search Report and Written Opinion for related International Patent Application PCT/US2022/034404 Issued on Oct. 11, 2022, pp. 1 to 11.

(Continued)

*Primary Examiner* — Ghazal B Shehni
(74) *Attorney, Agent, or Firm* — Pillsbury Winthrop Shaw Pittman LLP

(57) ABSTRACT

Provided are processes to increase security of database systems, in some cases with transparent retrofits. Examples may include the calling of external functions responsive to a data access event, such as detected by a database driver, upon connection attempt to, request attempt to, or retrieval of data from a database arrangement of a storage environment. The database driver, in response to detecting an event, may perform a call to an API, like a RESTful API, of a component or system that effectuates logic for determining instructions provided back to the database driver for responding to the event.

32 Claims, 5 Drawing Sheets

(56) References Cited

U.S. PATENT DOCUMENTS

2009/0187579 A1\* 7/2009 Brancaccio ......... G06F 16/2471
2015/0186664 A1 7/2015 Nicolaou
2016/0057107 A1 2/2016 Call et al.
2017/0364698 A1\* 12/2017 Goldfarb ............. G06F 16/9024
2019/0289036 A1 9/2019 Elliot et al.
2020/0218798 A1\* 7/2020 Kosaka .................. G06F 9/451

OTHER PUBLICATIONS

Notification Concerning Transmittal of International Preliminary Report on Patentabiility dated Dec. 28, 2023 for International Application No. PCT/US2022/034404, International Filing Date: Jun. 21, 2022.

\* cited by examiner

SECURITY DRIVER EXTERNAL FUNCTIONS

CROSS-REFERENCE TO RELATED APPLICATIONS

The present application claims the benefit of U.S. Provisional Appl. No. 63/212,599, filed 18 Jun. 2021, bearing the title "SECURITY DRIVER EXTERNAL FUNCTIONS." Each aforementioned application filing is incorporated by reference herein in its entirety.

BACKGROUND

1. Field

The present disclosure relates generally to cybersecurity and, more, specifically to scripting engines that apply security policies to database queries.

2. Description of the Related Art

Security and development teams alike are looking for ways to observe, detect, and respond to SQL (structured query language) statements issued from applications to databases that contain sensitive information. The ability to inspect and determine the validity of a statement with external code extends the security landscape into the SQL layer allowing per query and even per row inspection before returning information to a user or a requestor.

When applications are allowed to access sensitive data in databases, that application code is often the last line of defense against malicious access to the data. This means security teams often need to be involved with the application design, which does not happen for many reasons. The desire to impact the security of an application without needing to write code or change the application is growing with each cyber-attack. Relying upon developers to implement SQL based security has proven to not work or be too expensive for the business to survive.

SUMMARY

The following is a non-exhaustive listing of some aspects of the present techniques. These and other aspects are described in the following disclosure.

It should be appreciated that the present invention may be implemented in numerous ways, including as a process, an apparatus, a system, a device, a method, or a computer-readable medium. Several inventive embodiments of the present invention are described below.

Some aspects include a computer-implemented method for applying security policies to database queries. The techniques may increase security of database systems, in some cases with transparent retrofits. Examples may include the calling of external functions responsive to a data access event, such as detected by a database driver, upon connection attempt to, request attempt to, or retrieval of data from a database arrangement of a storage environment. A database driver, in response to detecting an event, may perform a call to an API, like a RESTful API, of a component or system that effectuates logic for determining instructions provided back to the database driver for responding to the event.

Some aspects include a tangible, non-transitory, machine-readable medium storing instructions that, when executed by a data processing apparatus cause the data processing apparatus to perform operations, including the process as mentioned above.

Some aspects include a system, including one or more processors, and memory storing instructions that, when executed by the processors, cause the processors to effectuate operations of the above-mentioned process.

BRIEF DESCRIPTION OF THE DRAWINGS

The above-mentioned aspects and other aspects of the present techniques will be better understood when the present application is read in view of the following figures in which like numbers indicate similar or identical elements.

Figure 1:
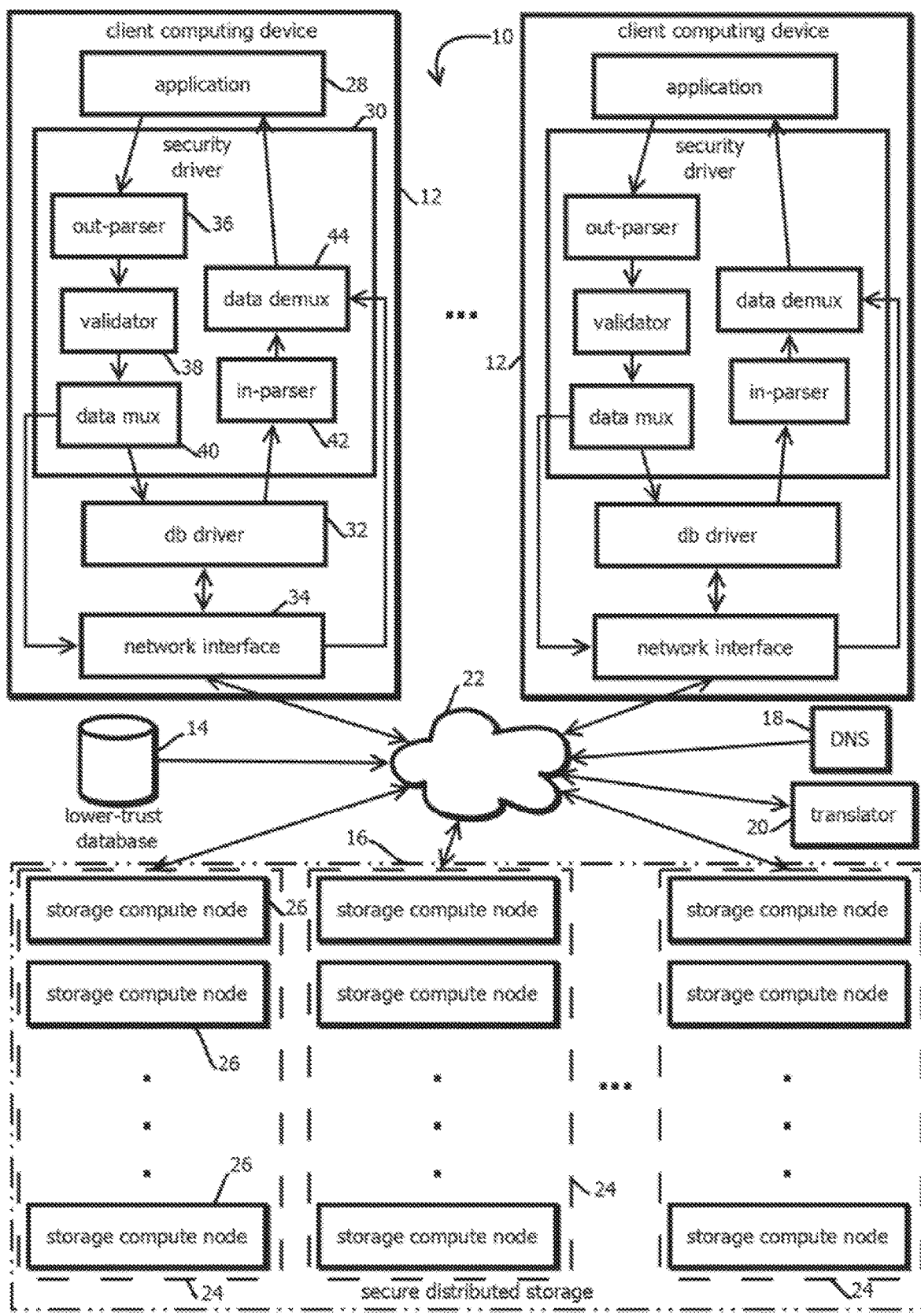
FIG. 1 illustrates an example environment for implementing data storage by a database arrangement, in some example embodiments.

While the present techniques are susceptible to various modifications and alternative forms, specific embodiments thereof are shown by way of example in the drawings and will herein be described in detail. The drawings may not be to scale. It should be understood, however, that the drawings and detailed description thereto are not intended to limit the present techniques to the particular form disclosed, but to the contrary, the intention is to cover all modifications, equivalents, and alternatives falling within the spirit and scope of the present techniques as defined by the appended claims.

DETAILED DESCRIPTION OF CERTAIN EMBODIMENTS

To mitigate the problems described herein, the inventors had to both invent solutions and, in some cases, just as importantly, recognize problems overlooked (or not yet foreseen) by others in the fields of cyber security. Indeed, the inventors wish to emphasize the difficulty of recognizing those problems that are nascent and will become much more apparent in the future should trends in industry continue as the inventors expect. Further, because multiple problems are addressed, it should be understood that some embodiments are problem-specific, and not all embodiments address every problem with traditional systems described herein or provide every benefit described herein. That said, improvements that solve various permutations of these problems are described below.

A variety of problems relating to security of datastores and networks of computers used by organizations are addressed by various versions of techniques described below. These different techniques can be used together, synergistically in some cases, so their descriptions are grouped into a single description that will be filed in multiple patent applications with different claim sets targeting the different techniques and combinations thereof. In view of this approach, it should be emphasized that the techniques are also independently useful and may be deployed in isolation from one another or in any permutation combining the different subsets of techniques, none of which to suggest that any other description herein is limiting. Conceptually related groups of these techniques are preceded by headings below. These headings should not be read as suggesting that the subject matter underneath different headings may not be combined, that every embodiment described under the heading has all of the features of the heading, or that every feature under a given heading must be present in an embodiment consistent with the corresponding conceptually related group of techniques, again which is not to suggest that any other description is limiting.

Example Computing Environment in which One or More Disclosed Techniques May be Implemented The techniques described herein may be understood in view of an example computing environment 10 shown in FIG. 1. The computing environment 10 is one example of many computing architectures in which the present techniques may be implemented. In some embodiments, the present techniques are implemented as a multi-tenant distributed application in which some computing hardware is shared by multiple tenants that access resources on the computing hardware in computing devices controlled by those tenants, for example, on various local area networks operated by the tenants. Or in some cases, a single tenant may execute each of the illustrated computational entities on privately-controlled hardware, with multiple instances of the computing environment 10 existing for different organizations. Or some embodiments may implement a hybrid approach in which multi-tenant computing resources (e.g., computers, virtual machines, containers, microkernels, or the like) are combined with on-premises computing resources or private cloud resources. In some embodiments, the computing environment 10 may include and extend upon the security features of a computing environment described in U.S. patent application Ser. No. 15/171,347, titled COMPUTER SECURITY AND USAGE-ANALYSIS SYSTEM, filed 2 Jun. 2016, the contents of which are hereby incorporated by reference.

In some embodiments, the computing environment 10 includes a plurality of client computing devices 12, a lower-trust database 14, secure distributed storage 16, a domain name service 18, and a translator server 20 (or elastically scalable collection of instances of translator servers disposed behind a load balancer). In some embodiments, each of these components may communicate with one another via the Internet 22 and various local area networks in some cases. In some embodiments, communication may be via virtual private networks overlaid on top of the public Internet. In some embodiments, the illustrated components may be geographically distributed, for example, more than 1 kilometer apart, more than 100 kilometers apart, more than a thousand kilometers apart, or further, for example distributed over the content event of North America, or the world. Or in some cases, the components may be co-located and hosted within a airgapped or non-airgapped private network. In some embodiments, each of the illustrated blocks that connects to the Internet 22 may be implemented with one or more of the computing devices described below with reference to FIG. 13.

In some embodiments, each of the client computing devices 12 may be one of a plurality of computing devices operated by users or applications of a tenant that wishes to securely store data. For example, a given business or governmental organization may have more than 10, more than 100, more than 1,000, or more than 10,000 users and applications, each having associated computing devices that access data stored in the lower-trust database 14 (or a collection of such databases or other types of datastores) and the secure distributed storage 16. In some embodiments, multiple tenants may access the system in the competing environment 10, for example more than five, more than 50, more than 500, or more than 5000 different tenants may access shared resources with respective client computing devices or may have their own instance of the computing environment 10. In some embodiments, some of the client computing devices 12 are end-user devices, for example, executing a client-side component of a distributed application that stores data in the lower-trust database 14 and the secure distributed storage 16, or reads is such data. Client computing devices may be laptops, desktops, tablets, smartphones, or rack-mounted computing devices, like servers. In some embodiments, the client-computing devices are Internet-of-things appliances, like smart televisions, set-top media payers, security cameras, smart locks, self-driving cars, autonomous drones, industrial sensors, industrial actuators (like electric motors), or in-store kiosks. In some embodiments, some of the client computing devices 12 may be headless computing entities, such as containers, microkernels, virtual machines, or rack-mounted servers that execute a monolithic application or one or more services in a service-oriented application, like a micro services architecture, that stores or otherwise accesses data in the lower-trust database 14 or the secure distributed storage 16.

In some embodiments, the lower-trust database 14 and the secure distributed storage 16 may each store a portion of the data accessed with the client computing devices 12, in some cases with pointers therebetween stored in one or both of these datastores. In some embodiments, data may be protected with the approaches described in U.S. patent application Ser. No. 15/917,616, titled USING A TREE STRUCTURE TO SEGMENT AND DISTRIBUTE RECORDS ACROSS ONE OR MORE DECENTRALIZED, ACYCLIC GRAPHS OF CRYPTOGRAPHIC HASH POINTERS, filed 10 Mar. 2018, and in U.S. patent application Ser. No. 16/024,792, titled REPLACING DISTINCT DATA IN A RELATIONAL DATABASE WITH A DISTINCT REFERENCE TO THAT DATA AND DISTINCT DE-REFERENCING OF DATABASE DATA, filed 30 Jun. 2018, the contents of which are hereby incorporated by reference. In some embodiments, as described below, this data may be stored in a manner that abstracts away the secure distributed storage 16 from a workload application through which the data is accessed (e.g., read or written).

In some embodiments, data access operations may store or access data in the lower-trust database 14 and the secure distributed storage 16 with a workload application that is not specifically configured to access data in the secure distributed storage 16, e.g., one that is configured to operate without regard to whether the secure distributed storage 16 is present, and for which the storage of data in the secure distributed storage 16 is transparent to the workload application storing content in the lower-trust database 14 and the secure distributed storage 16. In some embodiments, such a workload application may be configured to, and otherwise designed to, interface only with the lower-trust database 14 when storing this data, and as described below, some embodiments may wrap interfaces for the lower-trust database 14 with additional logic that routes some of the data to the secure distributed storage 16 and retrieves that data from the secure distributed storage 16 in a manner that is transparent to the workload application accessing content (i.e., data written or read by the workload application).

Content stored in the lower-trust database 14 and secure distributed storage 16 may be created or accessed with a variety of different types of applications, such as monolithic applications or multi-service distributed applications (e.g., implementing a microservices architecture in which each service is hosted by one of the client computing devices 12). Examples include email, word processing systems, spreadsheet applications, version control systems, customer relationship management systems, human resources computer systems, accounting systems, enterprise resource management systems, inventory management systems, logistics systems, secure chat computer systems, industrial process controls and monitoring, trading platforms, banking systems, and the like. Such applications that generate or access content in the database 14 for purposes of serving the application's functionality are referred to herein as "workload applications," to distinguish those applications from infrastructure code by which the present techniques are implemented, which is not to suggest that these bodies of code cannot be integrated in some embodiments into a single workload application having the infrastructure functionality. In some cases, several workload applications (e.g., more than 2, more than 10, or more than 50), such as selected among those in the preceding list, may share resources provided by the infrastructure code and functionality described herein.

In some embodiments, the lower-trust database 14 is one of the various types of datastores described above. In some cases, the lower-trust database 14 is a relational database, having a plurality of tables, each with a set of columns corresponding to different fields, or types of values, stored in rows, or records (i.e., a row in some implementations) in the table, in some cases, each record, corresponding to a row may be a tuple with a primary key that is unique within that respective table, one or more foreign keys that are primary keys in other tables, and one or more other values corresponding to different columns that specify different fields in the tuple. Or in some cases, the database may be a column-oriented database in which records are stored in columns, with different rows corresponding to different fields. In some embodiments, the lower-trust database 14 may be a relational database configured to be accessed with structured query language (SQL) commands, such as commands to select records satisfying criteria specified in the command, commands to join records from multiple tables, or commands to write values to records in these tables.

Or in some cases, the lower-trust database 14 may be another type of database, such as a noSQL database, like various types of non-relational databases. In some embodiments, the lower-trust database 14 is a document-oriented database, such as a database storing a plurality of serialized hierarchical data format documents, like JavaScript™ object notation (JSON) documents, or extensible markup language (XML) documents. Access requests in some case may take the form of xpath or JSON-path commands. In some embodiments, the lower-trust database 14 is a key-value data store having a collection of key-value pairs in which data is stored. Or in some cases, the lower-trust database 14 is any of a variety of other types of datastores, for instance, such as instances of documents in a version control system, memory images, a distributed or non-distributed file-system, or the like.

A single lower-trust database 14 is shown, but embodiments are consistent with, and in commercial instances likely to include, substantially more, such as more than two, more than five, or more than 10 different databases, in some cases of different types among the examples described above. In some embodiments, some of the lower-trust databases may be database of a software-as-a-service application hosted by a third party and accessed via a third-party application program interface via exchanges with, for instance, a user's web browser or another application. In some cases, access management may be implemented with the techniques described in U.S. patent application Ser. No. 15/675,434, titled CREDENTIAL-FREE USER LOGIN TO REMOTELY EXECUTED APPLICATIONS, filed 11 Aug. 2017, the contents of which are hereby incorporated by reference. In some cases, the lower-trust database 14 is a mutable data store or an immutable data store.

In some embodiments, access to a database may be designated in part with roles and permissions stored in association with various user accounts of an application used to access that data. In some embodiments, these permissions may be modified, for example, revoked, or otherwise adjusted, with the techniques described in U.S. patent application Ser. No. 15/171,347, titled COMPUTER SECURITY AND USAGE-ANALYSIS SYSTEM, filed 2 Jun. 2016, the contents of which are hereby incorporated by reference. For example, access to data in the lower-trust database 14, and corresponding access to corresponding records in the secure distributed storage 16, may be designated in part with roles and permissions stored in association with various user accounts of an application used to access that data.

Controls, reporting, user interfaces and APIs for software defined networking and access, and automated sensing to provision VPN tunnels may be implemented with the techniques described in U.S. patent application Ser. No. 15/675,539, titled INTERNAL CONTROLS ENGINE AND REPORTING OF EVENTS GENERATED BY A NETWORK OR ASSOCIATED APPLICATIONS, filed 11 Aug. 2017, the contents of which are hereby incorporated by reference. Some embodiments may log records and implement the present techniques in the architecture described in U.S. patent application Ser. No. 15/675,519, titled STORING DIFFERENTIALS OF FILES IN A DISTRIBUTED BLOCKCHAIN, filed 11 Aug. 2017, the contents of which are hereby incorporated by reference.

The database 14 is described as "lower-trust." The term "lower-trust" does not require an absolute measure of trust or any particular state of mind with respect to any party, but rather serves to distinguish the database 14 from the secure distributed storage 16 which has certain security features in some implementations described below and, in some cases, may be referred to as a "higher-trust" database.

In some cases, some of the data that an application writes to, or has written to, the lower-trust database 14 may be intercepted or moved to the secure distributed storage 16. Further, access requests from a workload application to the lower-trust database 14 may be intercepted, or responses from such access request may be intercepted, and data from the lower-trust database 14 may be merged with data from the secure distributed storage 16 that is responsive to the request before being presented to the application, as described in greater detail below. Further, read requests may be intercepted, modified, and iteratively executed in a manner that limits how much information in the secure distributed storage is revealed to a client computing device at any one time, as described below.

In some embodiments, the secure distributed storage 16 may include a collection of data centers 24, which may be distributed geographically and be of heterogeneous architectures. In some embodiments, the data centers 24 may be various public or private clouds or on-premises data centers for one or more organization-users, such as tenants, of the computing environment 10. In some embodiments, the data centers 24 may be geographically distributed over the United States, North America, or the world, in some cases with different data centers more than 100 or 1,000 kilometers apart, and in some cases with different data centers 24 in different jurisdictions. In some embodiments, each of the data centers 24 may include a distinct private subnet through which computing devices, such as rack-mounted computing devices in the subnet communicate, for example, via wrap top-of-rack switches within a data center, behind a firewall relative to the Internet 22. In some embodiments, each of the data centers 24, or different subsets of the data centers 24, may be operated by a different entity, implementing a different security architecture and having a different application program interface to access computing resources, examples including Amazon Web Services™, Azure from Microsoft™, and Rack Space™. Three different data centers 24 are shown, but embodiments are consistent with, and in commercial implementations likely to include, more data centers, such as more than five, more than 15, or more than 50. In some cases, the datacenters may be from the same provider but in different regions.

In some embodiments, each of the data centers 24 includes a plurality of different hosts exposed by different computational entities, like microkernels, containers, virtual machines, or computing devices executing a non-virtualized operating system. Each host may have an Internet Protocol address on the subnet of the respective data center 24 and may listen to and transmit via a port assigned to an instance of an application described below by which data is stored in a distributed ledger. In some embodiments, each storage compute node 26 may correspond to a different network host, each network host having a server that monitors a port, and configured to implement an instance of one of the below-described directed acyclic graphs with hash pointers implementing immutable, tamper-evident distributed ledgers, examples include block chains and related data structures. In some cases, these storage compute nodes 26 may be replicated, in some cases across data centers 24, for example, with three or more instances serving as replicated instances, and some embodiments may implement techniques described below to determine consensus among these replicated instances as to state of stored data. Further, some embodiments may elastically scale the number of such instances based on amount of data stored, amounts of access requests, or the like.

Some embodiments may further include a domain name service (DNS) 18, such as a private DNS that maps uniform resource identifiers (such as uniform resource locators) to Internet Protocol address/port number pairs, for example, of the storage compute nodes 26, the translator 20, and in some cases other client computing devices 12 or other resources in the computing environment 10. In some embodiments, a client computing device 12, a storage compute node 16, the database 14, or translator 20 may encounter a uniform resource identifier, such as a uniform resource locator, and that computing entity may be configured to access the DNS 18 at an IP address and port number pair of the DNS 18. The entity may send a request to the DNS 18 with the uniform resource identifier, and the DNS 18 may respond with a network and process address, such as Internet Protocol address and port number pair corresponding to the uniform resource identifier. As a result, underlying computing devices may be replaced, replicated, moved, or otherwise adjusted, without impairing cross-references between information stored on different computing devices. Or some embodiments may achieve such flexibility without using a domain name service 18, for example, by implementing a distributed hash table or load-balancing that consistently maps data based on data content, for example based on a prefix or suffix of a hash based on the data or identifiers of data to the appropriate computing device or host. For instance, some embodiments may implement a load balancer that routes requests to storage compute nodes 26 based on a prefix of a node identifier, such as a preceding or trailing threshold number of characters.

Some embodiments may further include a virtual machine or container manager configured to orchestrate or otherwise elastically scale instances of compute nodes and instances of the translator 20, for instance, automatically applying corresponding images to provisioned resources within one or more data centers 24 responsive to need and spinning down instances as need diminishes.

In some embodiments, the translator 20 may be configured to execute a routine that translates between an address space of the lower-trust database 14 and an address space of the secure distributed storage 16. In some embodiments, the translator 20 may receive one or more records from a client computing device 12 that are to be written to the lower-trust database 14, or may receive such records from the lower-trust database 14, and those records may be mapped to identifiers (or other pointers, such as other node identifiers) in the secure distributed storage 16. The translator 20 may then cause those records to be stored in the secure distributed storage 16 and the identifiers to be stored in place of those records in the lower-trust database 14, such as in place of individual values in records. In some embodiments, translation may happen at the level of individual values corresponding to individual fields in individual records, like rows of a table in the database 14, or some embodiments may translate larger collections of data, for example, accepting entire records, like entire rows, or plurality of columns, like a primary key and an individual value other than the primary key in a given row. Some embodiments may accept files or other binary larger objects (BLOBS). The translator 20 that may then replace those values in the lower-trust database 14 with a pointer, like an identifier to that data in the secure distributed storage, and cause that data to be stored in the secure distributed storage 16 in the manner described below. In some examples, documents may be stored, which may be relatively small stand-alone values to binary large objects encoding file-system objects like word-processing files, audio files, video files, chat logs, compressed directories, and the like. In some cases, a document may correspond to an individual value within a database, or document may correspond to a file or other binary large object. In some cases, documents may be larger than one byte, 100 bytes, 1 kB, 100 kB, 1 MB, or 1 GB. In some embodiments, documents may correspond to messages in a messaging system, or printable document format documents, Microsoft Word™ documents, audio files, video files or the like.

In some embodiments, the translator 20 may include code that receives requests from drivers and facilitates the translation of data. In some cases, the translator 20 may be one of an elastically scaled set of translators 20 remotely hosted in a public or private cloud. The translator may, in some cases, implement the following functions:

1. Validate Request a. Using a database, some embodiments validate a combination of user supplied parameters such as predefined software IDs, client IDs, and machine specific identifiers registered at install time. This is compared against a known list and then further verified with IP address and/or other network specific parameters.

2. Data Validate a. Parsing the HTTP body and then decoding some embodiments determine the unique list of reference values to replace with plain text. Using a database, some embodiments first check if the requesting machine has the rights to access the data. Next using a database, some embodiments find the network name of the first hop of the piece of data and place into an array.

3. Threshold Check a. With the location of each unique requested segment (or node or document or content) identifier, some embodiments check against a series of threshold or rate objects. Some embodiments look for access rate, time window, or location based rules and apply the requested data against a mapping of rules. If any particular data is breaking a threshold then an anomaly in the system is generated resulting in notifications and logging in some embodiments.

4. Jobs a. The translator 20 may split up the data requests into jobs and places the job onto a work queue. The split may be done by a static per message job size and may use a deal-letter exchange to retry and finally fail messages 5. Response Function a. Data may be returned from the queue and plain text values may be matched and replaced with the corresponding pointers (such as segment, document, node, or unit-of-content identifiers, which is not to suggest that these or any other list of categories describe disjoint sets). Once all jobs have returned the response a response may be returned in some embodiments.

In some embodiments, the client computing devices 12 may each execute an operating system in which one or more applications 28 execute. These applications may include client-side portions of the above-described examples of workload applications, which may include business logic and other program code by which a service in a microservices architecture is implemented. In some embodiments, the applications 28 may be different in different client computing devices, and an individual client computing device may execute a plurality of different applications. In some embodiments, the applications 28 may be configured to interface with the lower-trust database 14 via a database driver 32 executed within the operating system. The database driver 32 may be any of a variety of different types of drivers such as an ODBC driver, a JDBC driver, and the like. In some embodiments, the database driver 32 may be configured to access the lower-trust database 14 via a network interface 34 of the client computing device 12, such as a network interface card connected to a physical media of a local area network by which the Internet 22 is accessed.

Some embodiments may further include a security driver 30 that interfaces between the application 28 and the database driver 32. In some embodiments, the security driver 30 may be transparent to the application 28, such that an application program interface of the database driver 32 is presented to the application 28 by the security driver 30, and that application program interface may be unmodified from the perspective of the application 28 relative to that presented by the database driver 32 in some cases. In some embodiments, the security driver 30 may wrap an application program interface of the database driver 32, such that the security driver 30 receives application program interface requests from the application 28 to the driver 32, acts on those requests, and in some cases modifies those requests, and then provides the request in some cases with modifications to the database driver 32. Similarly, responses back to the application 28 may be provided by the security driver 30 and in a manner consistent with that provided by the driver 32, as described in greater detail below.

In some embodiments, the security driver 30 is configured to engage the translator 20 after (or to perform) splitting data being written to (or attempting) the lower-trust database 14 by the application 28 into higher-security data and lower-security data. Again, the terms "lower-security" and "higher-security" serve to distinguish data classified differently for purposes of security and do not require measurement against an absolute security metric or a state of mind. The lower-security data may then be written by the database driver 32 to the lower-trust database 14 in the manner provided for by the application 28 without regard to whether the security driver 30 is present.

The higher-security data, on the other hand, may be stored in a manner described below by the translator 20 that renders that data relatively robust to attacks by malicious actors. When returning data to the application 28, for example in response to receiving a read request, these operations may be reversed in some cases. Again, these operations are described in greater detail below. Generally, in some embodiments, the data from the lower-trust database 14 and the data from the secure distributed storage 16 may be merged by the security driver 30, in some cases, before that data is presented to the application 28. By acting on the higher-security data within the client computing device 12, before that data leaves the client computing device 12, some embodiments may reduce an attack service of the computing environment 10. That said, not all embodiments provide this benefit, and some embodiments may implement the functionality of the security driver 30 outside of the client computing devices 12, for example, in a database gateway, in a database management system implemented at the lower-trust database 14, or on another standalone application executed in a computing device disposed between the lower-trust database 14 and the network and the client computing device 12 in a path to the lower-trust database 14.

In some embodiments, the security driver 30 includes an outbound path and an inbound path. In some embodiments, the outbound path includes an out-parser 36, a validator 38, a data multiplexer 40. The out-parser may classify values as higher-security or lower-security values applying one or more rules in a data policy described below. The validator may perform the statement validate function described below. The multiplexer may route data to the lower-trust database 14 or the translator 20 based on the security classification. In some embodiments, the inbound path includes an in parser 42, and a data de-multiplexer 44. The inbound path may include a parser 42 configured to detect pointers to data in query responses from the lower-trust database 14 that point to data in the secure distributed storage 16. The parser 42 may call the translator 20 to request that pointers be replaced with more securely stored data. In some cases, the de-multiplexer 44 may merge data from the translator 20 with lower-security data in the same query response. In some cases, the security driver may implement a process described below with reference to FIG. 8 and perform the following functions:

1. Statement Parse a. For a SELECT statement, there could be a WHERE clause which is looking to match data in a protected column. During this phase, some embodiments parse the SELECT statement and check if there is a need to flip any plain text values in the WHERE clause into the reference space. The statement may be marked for processing and passed along.

b. For an INSERT or UPDATE statement, there could be data in either the statement body or the WHERE clause (INSERT). During this phase, some embodiments parse the statement and check if there is a need to flip any plain text values in the WHERE clause or body into the reference space. The statement may be marked for processing and passed along.

c. The security driver may use a locally kept copy of the current protection settings for a given client. In some embodiments, it is this locally kept and updated (e.g., periodically or constantly) table that the database, table, and column names in the statements are compared against. The time between getting a new state table is determined by various factors.

2. Statement Validate a. During the operation of a database command some embodiments check the statement for potential injection or other malicious SQL statements and block the query or log that the event happened. This is a locally supported operation that can be done by each driver in some cases.

3. Statement Process a. Depending upon the results of Parse, the driver may make HTTP requests to a preset URL and asks for plain text data to be switched into the reference space, e.g., by the translator 20.

b. The statement may be updated with reference space data if needed and the statement may be delivered to the lower-trust database 14 server.

4. Result Set Process a. For a SELECT statement the result set is processed and if columns in the returned data match any entries in the locally held table, the security driver 20 may perform HTTP requests to switch reference space data to plain text space.

b. The driver 30 may iterate over the data and selects distinct values to place into an HTTP body and requests made using a preset URL and system DNS 18, e.g., by engaging the translator 20.

c. Data may be returned and replaced for each occurrence in the result set and returned to the application 28 in some cases.

Various aspects of the system above, or other architecture may implement various techniques expanded upon below. Through this approach, it is expected that other applications that implement traditional database drivers will require little or no modification to utilize a more secure storage architecture (e.g., including a secure distributed storage). In some cases, the process is completely transparent to legacy applications. Further, permissioning complexity may be relaxed with secure data routed to distinct, immutable, secure data structures, as access to, and modification of, data may be readily detected.

Certain types of data are expected to be particularly amenable to use with the present techniques. Often system-access credentials, like user names and passwords, are particularly sensitive, as entire accounts may be compromised if such information is subject to unauthorized access. Storing passwords on a local machine or in a database where the entire password is accessible in one location provides an easy target for threat actors looking to manipulate, steal, or otherwise misuse authentication credentials. Other examples include credit card numbers, social security numbers, or health-related data.

Some embodiments interface with blockchains as a storage data structure with an arbiter or other piece of middleware that is capable of taking as an input the full text representation of a user credential, starting from the last byte of that credential, fragmenting that credential into N pieces, and placing each piece on a physically (or virtually) separate blockchain backed storage data structure, with each piece containing pointers to the next storage locations of the fragmented credential. When an application or resource requests the reassembly of a fragmented credential, in some embodiments, an arbiter or piece of middleware is supplied with the location of the first byte of the credential. After reading the first byte, in some embodiments, the arbiter or middleware then reads the subsequent pointers until a null character or end of sequence character is read. Once all of the pieces have been read into memory, the arbiter or other middleware may respond to the application with the resultant unfragmented credential. Some embodiments may preprocess the credential and count the number of pieces that are required from the beginning before fragmenting the credential. Some embodiments may require that credentials yield a threshold number of fragments. Some embodiments may salt fragments or credentials before fragmentation to defeat or impair rainbow table attacks.

These and other techniques may be implemented transparently as retrofits to an existing workload application to enable an interface with a heterogeneous mix of databases and, in particular, with a combination of databases that includes a higher-security database than that which the application is configured to interface with as originally written, such as databases like those described above. It should be emphasized, though, that the present techniques are not limited to embodiments drawing upon the above-types of more secure databases and, and some cases, may be used in conjunction with other types of databases, such as another relational database or other type of datastore, such as one that is deemed to be higher-security or lower latency than that which the application accessing data is configured to interface with. In some embodiments, such processes may be executed by the above-describe security driver 30, though it should be noted that in some cases, some or all of the functionality may be executed in the translator 20 in a database gateway, in a database management system, or in some other computing device. In some embodiments, other components or combinations of components are used.

External Functions

In some embodiments, a tenant, which may be one of many tenants, may desire to selectively afford access to subsets of data within a database. For example, a tenant, like a payment processor, may utilize a database consistent with the computing environment 10 to store information about processed transactions. Those processed transactions may include different subsets of transactions that correspond to respective different $3^{rd}$ party entities and the payment processor may desire to permit the different entities to access a respective subset of transactions. The payment processor, e.g., a tenant, may, as a result, desire to implement an additional layer of access control for data accessible by the tenant that is stored within a database to selectively provide access to other entities (e.g., different $3^{rd}$ parties). Example use cases need not involve $3^{rd}$ parties, for example, a tenant may desire to selectively provide access to different employees or employee groups, or based on other characteristics, such as for different computing devices or groups of computing devices (e.g., a computing device in a lab or data center A may be controlled from accessing data accessible by a different computing device in a lab or data center B), or location (e.g., on premise, off premise), and the like.

Some potential methods of retrofits to control such access can be characterized by their inefficiencies in latency, use of computing resources, and consumption of developer time for deployment. For example, one solution might be for a tenant to periodically segment data within the database to spin off respective segments of data to different databases provisioned for each entity. Another solution might be for a tenant to perform the above operations as data is added or modified in the database to update the different databases. In each case, modifications to the different databases provisioned for the entities would need to be reflexively performed in the database of the tenant if maintaining consistency is desired. Another approach might be to modify code of an application, or database application, to provide desired functionality, however, in many cases there exists no easy path to retrofit as the developer may lack access to binaries of applications which need be modified to provide desired functionality.

Figure 2:
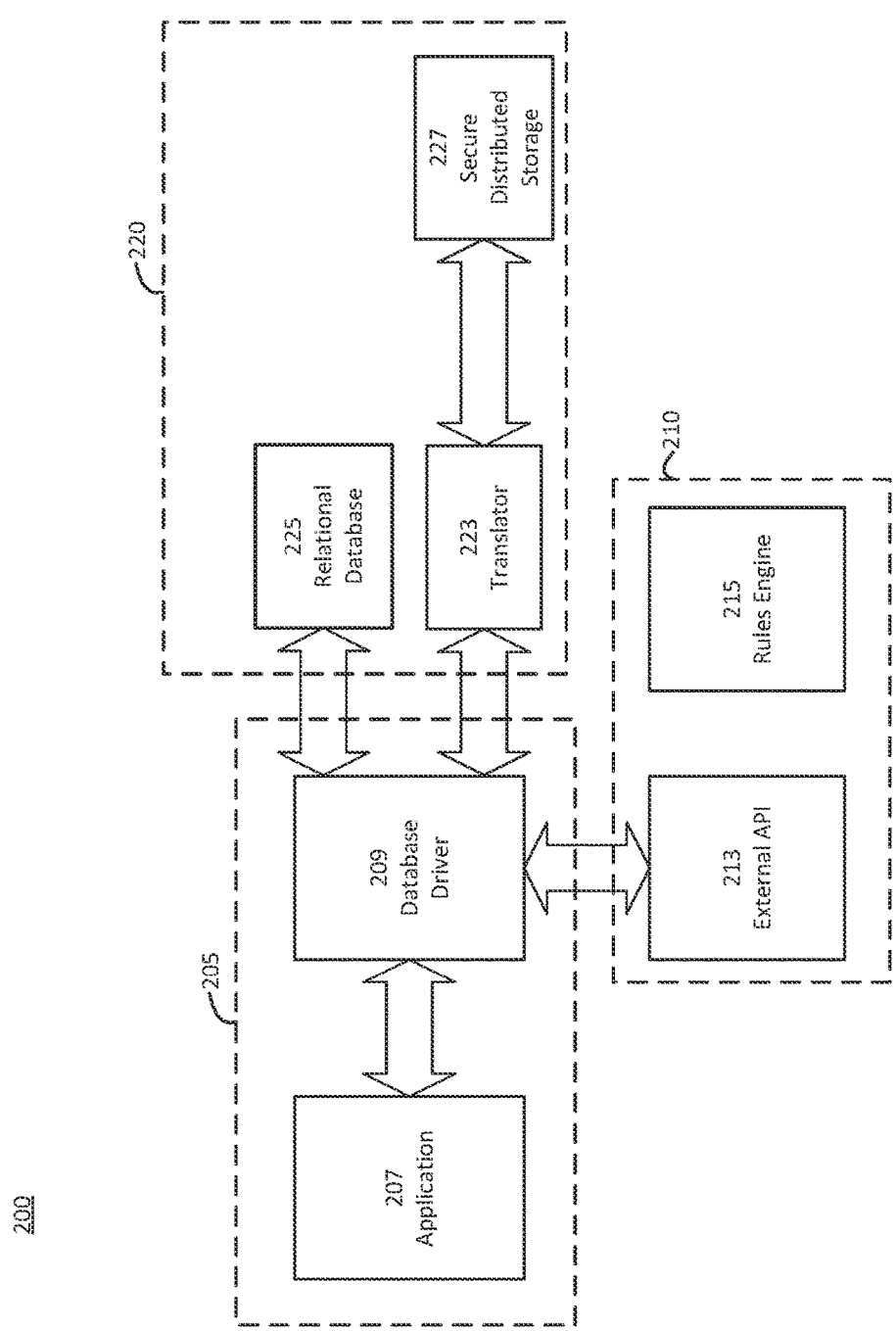
FIG. 2 illustrates an example environment within which external functions may be implemented to control data access to data within a storage environment, in some example embodiments.

FIG. 2 illustrates an example environment 200 within which external functions may be implemented to control data access to data within a storage environment, in some example embodiments. For example, some embodiments of external functions may provide selective access to tenant data or subsets of tenant data within a database in some embodiments. For example, as shown, FIG. 2 includes a client computing environment 205 (which may be a virtual machine instance or a client computing device), a storage environment 220, and an external function system 210. The client computing environment 205 may be a client computing device, virtual machine instance, or the like, examples of which are discussed with reference to FIG. 1 (e.g., like a client computing device), and may execute an application 207 that reads data that is or writes data to be maintained by the storage environment via queries to database driver 209. The storage environment 220 may include a relational database 225, translator 223, and secure distributed storage 227, examples of which are discussed with reference to FIG. 1 (e.g., like a lower-trust database, translator server, and secure distributed storage). The external function system 210 may include an external application programming interface (API) 213 and a rules engine 215.

In some embodiments, the client computing environment 205 may be one of a plurality of computing devices operated by users or applications of a tenant that wishes to securely store data. In some other examples, the client computing environment 205 may be a server which hosts a web application accessible by other clients. A given business or governmental organization may have more than 10, more than 100, more than 1,000, or more than 10,000 users and applications, each having associated computing devices that access data stored in the storage environment 220. In some embodiments, multiple tenants may access the storage environment, for example more than five, more than 50, more than 500, or more than 5000 different tenants may access shared resources. In some embodiments, a tenant may desire to provide selective access to their data to different users, computing devices, or parties. In other words, a tenant may permit a client computing environment 205 to access a subset of tenant data within the storage environment 220 and restrict the client computing environment from accessing some other subset of tenant data within the storage environment.

As shown, a client computing environment 205 may include an application 207 and a database driver 209. The application 207 may be an example of a workload application, examples of which are discussed with reference to FIG. 1. The database driver 209 may expose functions corresponding to the storage environment 220 to the application 207. For example, the database driver 209 may receive queries, like read and write requests, from the application 207 that are serviced within the storage environment 220. The database driver 209 may be a security driver that wraps legacy database driver functionality. For example, the database driver 209 may provide an interface between the application 207 and legacy database driver functionality, and extend that functionality. Or in some cases, the database driver 209 may include a shim that intercepts calls to a legacy driver. In some embodiments, such a database driver 209, whether functioning as a shim or a wrapper, implements extended functionality over that of a legacy driver and is transparent to the application 207. For example, the database driver 209 may present an application program interface exposing functions of the legacy driver to the application 207, and that application program interface may be unmodified from the perspective of the application. In some embodiments, the database driver 209 may wrap an application program interface of a legacy driver, and the database driver may register with the client computing environment to receive application program interface requests from the application 207 to the legacy driver, act on those requests, and in some cases modify those requests, and then provide the request in some cases with modifications to the legacy driver. Similarly, responses back to the application 207 may be provided by the database driver 209 and in a manner consistent with that provided by a legacy driver.

In some embodiments, processes implemented by the database driver 209, which may include external function calls, such as to an external function system, may be made transparent to a workload application executing within a client computing environment 205, such as a service on one host of a plurality of hosts executing different services in a micro-services architecture, or an application executing as a monolithic application on a single computing device. In some embodiments, processes implemented by the database driver 209 may be made transparent to an application by registering a process of the database driver in the operating system of the client computing device to appear to be a legacy driver that the workload application is configured to access and then wrapping an application program interface of the legacy driver.

Thus, some embodiments of a database driver 209 may be responsive to the same set of application program interface requests that a legacy driver is responsive to, while providing additional functionality. Further, some embodiments may then pass modified or unmodified application program interface exchanges between the workload application and the legacy driver. In many cases, source code of the workload application is unavailable or is expensive to modify. Thus, retrofitting existing workload applications in a manner that does not require changes to code of that application is expected to be particularly desirable. That said, the present techniques are also applicable in use cases in which the source code is available for the workload application and is modified to implement the present techniques, which again is not to suggest that any other description is limiting.

In some embodiments, the database driver 209 may pass requests, like queries, to a storage environment 220. In some examples, those queries may be modified by the database driver 209, or another component at the data level (e.g., data that is to be stored or retrieved from storage environment 220). For example, the database driver 209 may identify high security values that are to be written within a field within the relational database 225, pass those high security values to a translator 223, and receive identifiers of those values from the translator (which causes the high security values to be written to the secure distributed storage 227, locatable by the respective identifiers), the database driver 209 modifying the request to the relational database to write the identifiers in place of the high security values. In turn, when the database driver 209 encounters the identifiers within the field that were written in place of the values, the database driver 209 may request the values from the secure distributed storage 227 via the translator 223 based on the identifiers, such as to replace each identifier with the respective value.

Other embodiments as disclosed herein, however, are not limited to the above configuration. For example, all or some aspects of a process for query processing may be implemented by one or more other components coupled to a network, such as components of a database arrangement (e.g., at a logical level above the database arrangement or a database of the database arrangement), as a service which may interface with a requesting entity and a database arrangement or database of a database arrangement, or other component which could be either in-line with the request-response path (e.g., to receive requests) or coupled to the request-response path (e.g., to intercept and act on requests, such as by specifying rules at a network switch or proxy element to selectively reroute some request-response traffic to the component for processing). Thus, for example, all or a portion of query processing in accordance with the disclosed techniques may alternatively be implemented at a translator, an API of a server (e.g., like of an external function system 210, or other server), or a proxy server for a storage environment, or other suitable component described herein that may obtain (e.g., from the database driver 209) queries generated by applications (e.g., of a client or a web application of a server) or process prior to servicing of the query from a database (e.g., relational database 225 or secure distributed storage 227).

In some embodiments, external and user defined functions may be executed at certain moments in a data access pattern, examples of which include onConnection (e.g., to a storage environment), onQuery (e.g., request to a storage environment), and onRow (e.g., after return of data by a storage environment). In each of these moments (among other possible moments in a data access pattern) external function calls may be performed by a database driver 209 to an external function system 210, and the external function system may enforce governance over data access. Governance enforcement by the external function system 210 may be performed responsive to certain contextual parameters about each access pattern for analysis. It should be noted that similar techniques can be applied at other stages, aside from these three, to mitigate the risks involved with SQL statements issued from applications to databases that contain sensitive information.

In some embodiments, contextual triggers for the external functions by which a database driver 209 is configured to call the external function system 210 may be held on an outside and independent host and may requested for (or by) the database driver for loading upon boot. This may allow the code for the functions to be controlled by a potentially separate operational organization (e.g., tenant) than the actor (e.g., $3^{rd}$ party) consuming the database driver, in some example use cases. The contextual triggers for functions of the database driver to be consumed by a business user of an application using the database driver may be described for notification of the user upon connection or query to a storage environment or based on actions taken by the external function system.

The external function system 210 may be implemented in different ways, depending on a desired architecture or deployment. In some embodiments, the external function system 210 may be implemented within a client computing environment 205. For example, the external API 213 and rules engine 215 may be provided in a client computing environment 205 in connection with a security driver that provides or includes database driver 209 functionality. In some embodiments, the external function system 210 may be implemented by a server, like a server of a tenant, which a database driver 209 (or security driver including database driver functionality) can be configured to call (e.g., before executing on submitting a query onto the storage environment 220), or as a proxy server of a storage environment 220. Configuration of the database driver 209 to perform an external call to the external function system 210, whether the external function system is implemented as a standalone server, proxy of a storage environment, or within a client execution environment adds ability for a tenant to allow, prevent, or modify a query (e.g., to limit a $3^{rd}$ party to a subset of tenant data) with seamless retrofit control of applications/databases with additional functionality implemented within the external function system 210. Rules, like within a script implementing a policy executed by the rules engine 215, may be expressed at a high level. For example, client identifiers indicative of a client execution environment, like different user accounts, different computing devices, or other applicable identifiers for filtering access like a client location (e.g., based on IP address), may be specified individually or grouped in association with rules that indicate whether to allow or prevent a query, or how modify a query for the respective users, computing devices, or based on other factors.

In some examples, the external function system 210 may be positioned, like a proxy server, between the client execution environment 205 and the storage environment 220, e.g., with data flows between the client execution environment and the storage environment 220 flowing through the external functions system. Thus, for example, the external functions system 210 may append query-level modifiers prior to the servicing of queries by the storage environment 220. In some examples, the external function system 210 need only be positioned to proxy the relational database 225, such as to append query-level modifiers prior to servicing of a query to write data or return data to the database driver 209, which may be based on user/account/computing device identifiers.

In some embodiments, an external function system 210 implemented as a proxy for a storage environment 220 may provide a connection to the database driver 209 by which queries and responses flow between the driver and components of the storage environment 220. In some examples, external function system 210 may control a connection string so that when the database driver 209 requests a connection to the storage environment 220, the connection is provided through the external function system. In some examples, such a configuration permits an additional credentialing layer, such as from a key-management service, so that there is nothing in a connection string that allows a client to connect to the storage environment 220 without being governed by rules implemented by the external function system 210 or without credentialed access.

In some embodiments, such as when an application 207 or database driver 209 attempts to connect to a database, like a database within a storage environment 220, an external function call may pass one or more client (or application) credentials on a connection string. The external function may either return with the same connection string or return to the database driver 209 a new connection string. Implications of this action may be as simple as controlling access to a read only database to as impactful of abstracting user credentials preventing direct, untraceable access to sensitive data by users. For example, users may supply Okta or Active Directory credentials (or other credentialing service) when connecting through applications or directly to the storage environment. In an onConnect function, these credentials may be used to authenticate and authorize a user's access to data with integrations or API calls. The external function system 210 after authentication of a client or user to permit a connection may return to a database driver a proper connection string with database credentials and then associate each query through that connection to the authenticated user. Multi-Factor (e.g., Two-Factor Authentication (2FA)) may also be performed, such as based on identification of a user account or client-user association for triggering a request for authentication of the user via a supplementary identity factor (e.g., in accordance with a multi-factor authentication scheme), in some cases via a secondary device, like a mobile phone.

In some embodiments, when the database driver 209 obtains data from the storage environment 220, the database driver 209 may perform an API call to the external function system 210 to determine whether any data that is ready to be returned to an application 207 should not be returned (or should be modified). Thus, for example, embodiments may determine whether some values of records should be returned, removed, or modified (e.g., onRow). In some embodiments, when an application attempts to iterate over a result set, an external function may fire on row access and pass all to-be-returned data to external function system 210. In some embodiments, the external code may change the result set before the data is returned to an application 207 for access by a user. Techniques such as dynamic masking of sensitive data, or using the returned data, determine if GDPR or CCPA violations would occur if the particular user accessed the row of data. In some embodiments, when an application attempts to iterate over a result set, the external function system 210 may inspect a set of rows before any results are returned to the application, apply row-level security policies to the retrieved set of rows on a row-by-row basis. For example, in some use cases a tenant may wish to scrub certain values or fields from records made available to 3$^{rd}$ parties or otherwise for different users. A rules engine 215 may implement a script (e.g., based on a policy selected based on client identifiers) to mask, delete, or hash values in one or more fields or look for specific values to mask, delete, or hash in results to be returned to an application by the database driver. The external functions system 210 may perform the modification on the data and provide the resulting modified data to the database driver 209 in an API response for return to an application by the database driver.

In some embodiments, when the database driver 209 receives an application attempt to query a database, an external function may fire on the query request access event, passing the requested query, which may or may not include a tokenized or parse query object, to the external functions system 210. In some embodiments, a rules engine 215 may execute code to determine whether to allow the query to execute (e.g., true) or false with an accompanying message as to why the query was blocked from executing. In some embodiments, the rules engine 215 may return a new or modified query for execution. In some embodiments, contextual information, like client or user identification information may be appended to a query in the form of a comment for security or tracking reasons.

In some examples, queries may be modified by an external function system 210 at the query level. For example, the database driver 209 may pass requests, like queries, to the external function system 210, prior to processing queries (e.g., as described above) in connection with the storage environment 220. In some examples, the external function system 210 may be provided in connection with a database driver 209 and executed within the client computing environment 205, the database driver 209 being configured to call the external function system in response to receiving a query from the application 207. In other examples, the database driver 209 may be configured to call the external function system 210, such as via an API call over a network, like a RESTful API call, in response to receiving a query from the application 207. In either case, the query may be modified by the external functions system 210, such as based on one or more rules effectuated by a rules engine 215, and a modified query may be returned to the database driver 209. The database driver 209 may then service the modified query, which in some examples, may include further modification to the query at the data level (e.g., responsive to identification of high-security values, or references corresponding to high-security values). Thus, for example, in some cases, a query may undergo multiple modifications, such as by the external function system 210, and then by the database driver 209 or other component. The external function system 210 may modify queries to enforce how data can be written or what data can be retrieved from the storage environment 220, such as by appending query-level modifiers, which may be based on user/account/computing device identifiers.

In example embodiments herein, the external function system 210 may implement rules by which permissions to access subsets of data may be enforced for different users, entities, or computing devices. For example, a database driver 209 may be configured to determine information about the client computing environment 205 within which it is executed. The database driver 209 may obtain instructions when executed (e.g., upon boot of a client execution environment 205), which in some examples may include provisioning from a server (e.g., of the external function system 210 or storage environment 220), and the instructions may guarantee function and behavior of a database driver authorized to interface with the storage environment. Those instructions may cause the database driver 209 to determine information about the client computing environment 205, such as one or more identifiers corresponding to the application, user account, or computing device. For example, the database driver 209 may determine an application identity, like an application identifier, and may additionally determine user credential information, like a user account name provided by the user to the application. In some examples, such as in instances where application access is managed by active directory or other credentialing service, the database driver 209 may obtain an OS-level user name or computer name identifier (e.g., from the operating system). Thus, the database driver 209 may obtain one or more identifiers (e.g., client identifiers), which may include, but is not limited to one or more of an OS user account name, computer name, application, application user name, or other active directory or identifier information determinable by the driver 209, or associated with the driver (e.g., in some examples the driver may register with the storage environment 220 or the external functions system 210 upon execution). The instructions may cause the database driver 209 to include one or more such client identifiers with API requests, queries, or other requests. In some examples, the database driver 209 may receive a modified query from the external function system 210 that includes one or more such identifiers appended to a query (e.g., as non-executable information). In turn, the storage environment 220 may be configured to reject queries that do not include one or more such identifiers, or where the one or more identifiers cannot be matched to authorized identifiers (or combinations thereof), like in a directory of authorized users/computing devices/applications/etc.

Some embodiments of a storage environment 220 may generate an audit log which shows all attempts to access the storage environment. In some cases, these access logs can be notated with request-specific information such as: the above-described client identifiers, in addition to geolocation, client machine IP address, etc. and further include the request (e.g., query) which the client attempted.

In some examples, a second audit log including information like that indicated above may be separately generated by an external function system 210. For example, the external function system 210 may generate a second log which may include information about an original request (e.g., query), such as prior to modification of that request (e.g., query) based on rules governing access to different subsets of data, and also the modified request (e.g., query). Tampering with a modified query (e.g., by a nefarious party) may be determined based on a comparison between a modified query as recorded by the second audit log generated by the external function system 210 and a query (e.g., the modified query) as received by the storage environment 220. In some examples, the external function system 210 may store information to a second audit log that is accessible by components of the storage environment 220, and in some examples, may store information for the second audit log within the storage environment 220, like within an audit log database (which may include first and second audit logs). In some example embodiments, prior to acting on a query, the storage environment 220 may determine whether a query received from a database driver 209 resolves to a modified query as determined by the external function system 210, such as to guarantee a query has not been tampered with (e.g., to attempt to access data from a subset to which the client or user is not permissioned to access) subsequent to modification by the external function system.

As shown, the external function system 210 includes an external API 213 and a rules engine 215. An example embodiment of the external API 213 may be a light-weight layer exposing a (RESTful) API service for handing API requests, such as those received from a database driver 209, and provide responses to those API request back to the database driver. The external API 213 may be implemented by a computing device, like a server, or in some cases within a database (or security) driver. In some embodiments, external API 213 may be implemented by one or more computing devices within a cloud service, such as a cloud service configured to interface with, or including a storage environment 220. Different embodiments may implement these components in different ways. In some cases, the external API 213 may be resident on a same computing device, or different computing devices, or same or different collections of computing devices that provide the storage environment 220. For example, the API may be exposed via a translator 223 (e.g., as illustrated in FIG. 2). In some embodiments, the API may be exposed via a different component of a database arrangement or system, for example, the API may be exposed by an API server (e.g., performing the operations of the external function system 210) as a standalone component. In some cases, API requests may be sent over a network, such as a public or private network, and some API requests may be conveyed between processes executing on the same computing device, for instance, via a loopback IP address or a system call. In some cases, the API be implemented as an interface within a given process, such as an API of a framework or library. Various processes, drivers, applications, or other aspects of database arrangements and systems like those described herein may convey requests to the API, implement the API, or provide data backing responses returned by the API in response to requests. Accordingly, FIG. 2 illustrates an example environment within which at least some example configurations of an API may be implemented and should not be read as limiting.

In some embodiments, the API 213 may be a representational state transfer (REST) API and entities may be configured to convey API requests (or commands) via hypertext transport protocol secure (HTTPS) to which responses may be provided by the API (e.g., in a response over HTTPS). In some embodiments, such API requests (or commands) may include an API base URI corresponding to the API server, one or more paths appended to the base URI corresponding to different resources accessed via the API server, and corresponding API endpoint URLs may be responsive to one or more of a discrete set of commands, or methods, corresponding to operations to be performed on those resources at those endpoints, such as POST, GET, PATCH, and the like. In some cases, these operations may correspond to read or write operations, for instance in the case of POST and GET. In some cases, API commands may further include API parameters, which in some cases, may be appended to the URL as part of a query string, e.g., as a set of key-value pairs delimited from the URL prefix with a "$" and delimited from one another with an ampersand. In some cases, query parameters may include an authentication credential, and embodiments may selectively grant access to corresponding portions of a database arrangement or within a database in response to verifying the authentication credential.

The rules engine 215 may process requests received by the external API 213. For example, the rules engine 215 may include one or more policies by which a tenant desires to govern access to tenant data within the storage environment 220. A policy may specify rules to be applied to request (e.g., queries) that match certain criteria, examples of which may include various client identifiers. For example, API requests received by the external API 213 from a database driver 209 may include identifiers corresponding to the client computing environment 205, and one or more such identifiers may be passed to the rules engine 215 for determining a modification to query. For example, an API request received by the external API 213 may include a query, or a request to perform a query, and a string of client identifiers. The rules engine 215 may identify, based on the string of client identifiers, a policy to apply, such as by matching the string of client identifiers, or one or more of the identifiers in the string, to corresponding client identifier information associate with a policy. The policy may indicate one or more rules to apply based on the identifiers. For example, a string of client identifiers may be received as an argument, or one or more identifiers as different arguments, to an executable script comprising a plurality of rules configured to output a query modification (or number thereof). In other examples, a key-value store corresponding to a policy may indicate which rules (e.g., values, like a query modification) to apply for which keys (e.g., client identifiers), which may be selected in a sequence based on the order of client identifiers in a string of such identifiers. In embodiments where a query is received in association with a request, the rules engine 215 may append one or more modifications to a query to generate a modified query. In other examples, the rules engine 215 may output one or more modifications for appending to a query, such as by the database driver 209, prior to submitting the query to the storage environment 220. In either case, the one or more modifications may include query logic or statements, like arguments, to be implemented during processing of the query by the storage environment 220. For example, the modifications may include arguments that enforce selection of records from within a subset of records within the storage environment 220, like from within the relational database 225 (and thus cause the relational database to return only records from within a subset of records to which the client computing environment is permitted to access).

In some examples, one or more received client identifiers, or a hash of the received client identifiers, may be selected (or determined) for appending to a query in addition to the above-described modifications to query logic by the external function system 210. For example, the database driver 209 may include with an API request to the external API 213 one or more identifiers (e.g., client identifiers) corresponding to an OS user account name, computer name, application, application user name, active directory information, or the like.

The client identifier information may be included with one or more of the above-described modifications of a query, and a modified query or instructions for modifying a query returned by the external API 213 to the database driver 209 responsive to an API request. This client identifier information may be appended to a query (e.g., a modified query) as a non-executing informational component (e.g., may be delineated from logic of a query) for logging by the storage environment 220 upon receipt of the query (e.g., the modified query with appended client identifier information) from a database driver 209 (or other source). The external function system 210 may also generate an audit log, such as of modifications to queries or resulting modified queries, which may also include client identifier information. Thus, for example, verification that queries on the storage environment 220 are performed as specified by the external function system 210 may be performed.

In various example embodiments, a database, like a first database within the storage environment 220, may be a relational database 225. In some embodiments, the relational database 225 may be a lower trust database, such as in accordance with one or more examples described herein. In some cases, the relational database 225 may be an SQL database. In some embodiments, an end-user facing font-end is supported by the relational database 225, which may be accessible by client computing devices via a driver as described herein. In some cases, the end-user facing front-end may provide operations for querying or uploading data, such as within the relational database 225, and some of that data may be user data, and those read/write operations may, in some cases, necessitate reads or writes of data within a second database within the storage environment 220, like a secure distributed storage 227. In some examples, the end-user facing front-end may be provided by an intermediate server or service of the storage environment 220. In some cases, such a configuration is provided to support legacy or existing client application which are configured to interface with a relational database, like an SQL database. As previously described, some reads or writes may pertain to data values which have been replaced by references, or which should be stored in the secure storage 227 and a reference to that data is stored in the relational database 225.

An example relational database 225 may include a plurality of tables, each with a set of columns corresponding to different data fields, or types of values. A table may include one or more entries within the table, like records (e.g., a row in some implementations) in the table, and a given record may include one or more associated values corresponding to respective ones of the columns (or data field or type of value). In some cases, each record corresponding to a row may be a tuple with a primary key that is unique within that respective table, one or more foreign keys that are primary keys in other tables, and one or more other values corresponding to different columns that specify different fields in the tuple. Or in some cases, the database may be a column-oriented database in which records are stored in columns, with different rows corresponding to different data fields. In some embodiments, an example database may be a relational database configured to be accessed with structured query language (SQL) commands, such as commands to select records satisfying criteria specified in the command, commands to join records from multiple tables, or commands to write values to records in these tables.

Arrangements of database access by an application (or other entity), such as in embodiments including one or more relational databases, may support complex regular expressions (e.g., those that may match to multiple different strings) or other 'wildcard' type searches over data stored in the database. For example, an operational clause of a query may include an argument which multiple different potential strings may satisfy, like in a structured query language (SQL) statement. For example, a query may be operable to search for an entire data value using a subset of that data value, and such queries may search for multiple potential data values (e.g., those data values that match a subset of a data value being used in the search). Various operational clauses rely on a matching of a subset of a data value to multiple potential data values, either natively (e.g., in the case of searching though data values) or by dependency (e.g., a subsequent operation which relies on the results of searching through data values).

In one example, one or more numbers (e.g., corresponding to the respective values of different rows or records for a given column or data field) may be queried by the last (or first, or other position of) X many digits. For example, a given column (e.g., a given data field) may include social security numbers or credit card numbers for a plurality of records, and the last four digits of a social security number or last four digits of a credit card number may be submitted in a query to return data from records which include a value within the data field having last four digits matching those of that argument in the query. An argument of the query may also specify which data fields of the matching records are returned (e.g., customer name, zip code, social security number, credit card number, etc.), or the query may also include other operational clauses including other arguments which may be based on the identification of those records to return. For example, records that match an example query for the last four digits of social security number (e.g., '1234') may be identified and information (like a subset or all data field values) from those records may be returned, or data from other records in other portions of the database (like records in other tables) may be identified and returned (e.g., to return related data from some other table based on values associated with identified records). A subset of data fields to be returned for identified records may be specified by the argument, or additional operational clauses (e.g., including arguments) of the query or in some cases all data fields of the record or the record itself may be returned.

Thus, a user (e.g., via an application), or a process, may submit a query that relies on search within a data field of a plurality of records to identify a set of records having a matching value (which may include matching of the query string to a portion of a full string of a value) within the data field to retrieve information from or retrieve the set of records.

In some example embodiments, it is advantageous to implement policy rules at a high level, such as where a tenant desires to permit multiple different users or third-parties access to different subset of tenant data within the storage environment 220, but not all tenant data. Rather than segmenting data for each user or third-party within different relational databases 225, such as to isolate respective access to distinct subsets of data, an external function system 210 may implement a rules engine to modify requests at the query level. Some examples of such modifications that may operate on plain text values, such as those stored in a relational database 225, are outlined below.

For example, considering the above example of stored information like customer name, zip code, social security number, credit card number, etc. corresponding to respective columns (e.g., a given data field of a record), one or more of the above or other columns may include information by which a tenant may desire to selectively permit access to a subset of data. For example, the stored information may include a column indicating a credit card issuer, like VISA, MASTERCARD, etc., which may be stored in plain text as a low-security value (e.g., not replaced by a reference to the plain text value in the higher-security data store within which high-security values are stored). A tenant may desire to permit access to records where issuer=VISA to a $3^{rd}$ party, like VISA, without permitting VISA access to records where issuer/=VISA (e.g., where issuer=MASTERCARD or some other issuer).

Another example may include plain text location information associated with a record. For example, sales records may include stored information corresponding to a customer name, location (e.g., state, region, zip code, etc.), sale amount, date of sale, etc., and different employees of the tenant may be responsible for sales within different locations. For example, employee A may be responsible for sales in California, and employee B for sales in Oregon, while a regional sales manager may be responsible for west coast sales, but not east coast sales. Accordingly, a tenant may desire to permit employee A access to records where location=CA, employee B access to records where location=OR, and the regional sales manager to records where location=CA or OR (or where a supplementary field for a column corresponds to region, like WEST, where region=WEST).

In the above noted examples, the external function system 210 may modify a query to force a selection from within a subset of a records. For example, the external function system 210 may modify a query requested by employee A for records (e.g., where sale amount >$10,000) to limit the selection to "where location=CA." Thus, for example, the modified query selects records having a sale amount >$10,000 and having a location=CA. In another example, such as for a regional sales manager, a query for records (e.g., where sale amount >$10,000) may be modified to limit the selection to "where location=CA or OR or [other states in region]" or "region=WEST." In another example, a $3^{rd}$ party entity, e.g., VISA, that requests records may have all queries modified by "where issuer=VISA" such that only records of that entity are returned.

Example configurations utilizing a more secure (e.g., second) database, like a secure distributed storage 227, in accordance with the above techniques may afford a greater level of security, such as by the enforcement of additional data policy rules governing access to the second database (or data stored therein) over access the first database (or data stored therein). These data policy rules may be implemented at the data level. In various example embodiments of databases disclosed herein, plain text data that might otherwise be stored within a first database (e.g., relationality database 225) may, instead, be stored in a second database (e.g., secure distributed storage 227). Rather than omit inclusion of information pertaining to the plain text data within the first database, references, like identifiers, to the plain text data (e.g., that do not reveal information about the plain text data) stored within the second database may be included in the first database. For example, a reference (e.g., instead of some plain text data) may be stored as a value in association with a data field of a record maintained in the first database. The reference stored, e.g., within the data field for the record, may correspond to the plain text value which it replaced without revealing information about the plain text value (or other plain text values). For example, the reference may be indicative of a location within the second database of plain text data corresponding to the value (e.g., in plain text) for the data field of the record in the first database. Examples of a location may be a pointer, like a hash pointer, such as a cryptographic hash pointer to the location of a node, record, or other element within the second database within which data is stored or corresponds to stored data. References, as described herein, may include values by which a location of corresponding data within the second database may be determined or is indicative of a location of corresponding data within the second database. For example, an identifier of a transaction (e.g., like a TXID) by which data was stored within the second database may serve as a reference, where the TXID is utilized to locate and obtain data (e.g., that which was stored) from within the second database. The TXID may be a pointer, as described herein, in that it points to a location of data within the second database. In various embodiments, such as those where the second database includes an acyclic graph of hash pointers (like cryptographic hash pointers), like a blockchain-based database, the TXID may be a hash pointer (like a cryptographic hash pointer) to a location (e.g., like a node) or otherwise operable to obtain a location (e.g., of a node) within the graph where corresponding data is stored. Referring to FIG. 2, for example, some plain text data that might otherwise be stored within a relational database 225 may be replaced with references to that data as stored within a more secure database, such as a secure distributed storage 227.

As outlined above, it is advantageous to implement policy rules at a higher level, such as where a tenant desires to permit multiple different users or third-parties access to some subset of tenant data within the storage environment 220, but not all tenant data. Specifically, rather than segmenting data for each user or third-party within different relational databases 225, such as to isolate respective access to distinct subsets of data, the external function system 210 may implement a rules engine to modify requests at the query level. The above examples of query modification work well for fields including plaintext values, or single reference replacement values (e.g., where VISA or MASTERCARD, for example, is consistently replaced with a single reference value, but it is noted that in many configurations it is desirable that same values in different records are represented by different reference values, such as to limit inferences one could make based on re-use of a single reference value for each same instance of an underlying plaintext value).

Credit card numbers (among other informational sets) may include schemas of informational components which may be delineated by pre-fixes (or suffixes) of a set of values within a string of values, and those string of values may be deemed higher-security values, being stored in a secure distributed storage 227, and a reference value being stored in place of the value within the relational database 225. Such schemas of informational components may be apt for segmenting of records for access by different parties but are designated as higher-security values.

In some example embodiments, it may be desirable to segment records for access by different parties based on (e.g., higher-security) values in a field that have been replaced by reference values. For example, rather than rely on only fields that include plaintext values by which a subset of records may be selected from with query modifications, some embodiments may enable selection of a subset of records using a field that includes reference values (e.g., identifiers) in place of the plain text values. In the example of credit card information, a credit card number field may be designated as containing higher-security values, and thus those values (e.g., credit card numbers) are stored in the secure distributed storage 227, with a reference to obtain that value from storage 227 being stored in its place in the field within the relational database 225. The different digits of credit card numbers correspond to different information sets. For example, the first digit of the card is known as the MII digit, and indicates the credit card's scheme, e.g., a 4 indicates a VISA card, a 3 indicates an AMEX card, etc. Additionally, the first six digits of the card number, inclusive of the MII, are called the IIN (Issuer Identification Number) or BIN (Bank Identification Number). This sequence uniquely identifies the bank that issued the card. Thus, rather than providing for a new plaintext low-security field to include plaintext information indicative of the above information (e.g., VISA, AMEX, MASTERCARD) by which queries may be modified to restrict access of parties to respective subsets, it may be desirable to effect access controls within a higher-security field. For example, a selection from where credit card number=4% may restrict selection to VISA cards, without any requirement for an additional issuer field. Thus, an example query modification that may be performed by the external function system 210 to effectuate selections by a VISA employee to only those records pertaining to visa card may include appending where credit card number=4% to a query, thus limiting returned results to only VISA cards (e.g., having a credit number beginning with "4"). This query modification, however, requires additional considerations because the field which the modification targets within the relational database 225 to limit record selection contains references to those values in the secured distributed storage 227 rather than the plaintext values themselves.

As described above, plain text entries within the first database may be replaced with references to corresponding plain text entries within a second database, which may have a different data structure than the first database (e.g., the second database need not be a relational database). Thus, a reference data set may be stored within the first database and a plain text data set stored within the second database. In order for a query (e.g., in the schema of the first database) to look for data within the plain text data set, a translation of the query may need to occur because data in the plain text data set is obtained based on information within the reference data set. By way of example, an application may submit a query for '% ple', and if a plain text data set includes entries for 'apple' and 'people', those entries would be returned. However, where plain text data entries within a first database are replaced with references, such as abc123' for 'apple' and 'bca321' for 'people', embodiments may have to translate that plain text query directed to the first database into one that will successfully match to the 'abc123' and 'bca321' references with the reference data set in order to match to the corresponding plain text entries within the second database.

Figure 3:
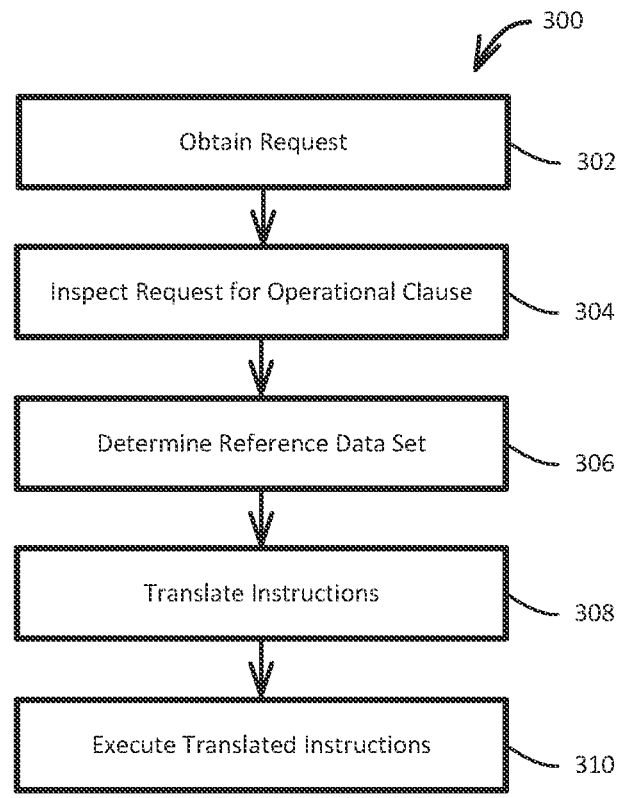
FIG. 3 illustrates an example process for processing requests to a database arrangement in accordance with some example embodiments.

FIG. 3 illustrates an example process 300 for processing requests to a database arrangement in accordance with one or more of the above-described embodiments. In some embodiments, a process 300 for effectuating a query in a relational database with reference values includes obtaining 302 a request. For example, a driver (or other component as indicated above) may obtain a request for querying data within a database arrangement. Some requests may be, or include, a query or other request to look for data in a relational database. In some cases, a query or lookup request, as issued by an application 207, may have a schema for querying plain text data. For example, the application 207, as outlined above, may issue a query in the schema for querying a first database with plain text data, like a relational database. In some embodiments, one or more aspects of request including a query or lookup request may be modified prior to being obtained for processing without altering a query or lookup request or otherwise include information indicative of an operation (or operations) to lookup (e.g., by structuring one or more queries based on the information) data entries in a relational database.

A relational database, however, for which an obtained query (or lookup request) is structured, may include a reference data set that replaced a plain text data set, and the plain text data set which was replaced may be maintained in another database (e.g., with which the query is not compatible). Obtaining records from within a relational database based on plain text values within a plain text data set, even though the plain text data set values are maintained in another database, remains advantageous in many use cases. However, such queries on those replaced values must perform lookup within the reference data set maintained in the relational database. An example database arrangement suitable for access in accordance with the disclosed techniques may include multiple databases, and one or more plain text data entries that satisfy the query may be maintained in another database that need not be a relational database or compatible with the schema for querying a relational database. This other, second database, may be a secure distributed storage within which a plain text data set that has been replaced by references within the first database is maintained with higher security. In at least some embodiments, the application may generate queries in the schema for querying plain text values expected in the first database without regard to or knowledge that plain text values may be replaced with references to locations in a second database. In other words, the application may not be natively configured to access or generate queries compatible with lookup in a reference data set within the first database or operable to return references for lookup in the first database, or plain text values in the second database, and benefits of the disclosed techniques may provide for the lack of a requirement to implement such configuration at the application level (or in some cases at both the application level and a database driver level in alternate embodiments, such as where aspect of the disclosed process are implemented within a security driver or other component which obtains queries in a schema for querying of plain text in a relational database that includes references to that plain text data within a second database rather than the plain text values themselves).

During (e.g., in response to obtaining and while processing) an obtained request, some embodiments of the process 300, such as when implemented within a database driver, external function system 210, or other component, inspect 304 an obtained request for an operational clause. Specifically, an obtained request may be inspected to determine whether it includes or is indicative of an operational clause for data lookup within a relational database. The relational database may be a first database within a database arrangement that includes at least a second database, which may store higher security values. As noted above, plain text data values within at least some fields of the relational database may be replaced with references indicative of locations or by which locations of the respective plain text data values within a higher security database may be obtained. The second data database may be a distributed datastore or database, like a blockchain-based database or datastore. Thus, a request for querying data within a database arrangement including at least a first database having a first data structure and a second database having a second data structure different from the first data structure may be obtained 302 and inspected 304 to identify whether instructions for querying data in the first database include an operational clause specifying criteria satisfied by plain text values, and whether those plain text were replaced with references. For example, a database driver, security driver, or API may obtain a request by intercepting the request or otherwise receiving the request from a client application or client device. In turn, the inspection 304 determines whether the request may be satisfied by querying within the first database (e.g., like an operational clause or clauses satisfied by lower-security values) or depends upon accessing the second database (e.g., includes an operational clause satisfied by higher-security values) because the plain text values to be evaluated to determine which records satisfy the operational clause are stored within the second database.

As an example, a request may include instructions for performing a query, and those instructions may include an operational clause (e.g., along with an indication of what and where to lookup data within a relational database). An inspection 304 may comprise identifying whether a WHERE clause (e.g., for an SQL query) or other lookup command is present or otherwise indicated. In some cases, the inspection may include parsing a statement. For example, for a SELECT statement, there could be a WHERE clause looking to match data in fields for which plain text data was replaced with references. Other statements may similarly include operational clauses, like a WHERE clause, that look to match data (or otherwise depend on matching data) to values in fields which contain references rather than plain text values. Such operational clauses may correspond to (simple or complex) regular expressions that match to a variety of different rows (e.g., records) having respective values (e.g., values of the respective records) within a column (e.g., a field), or other 'wildcard' type search over data in which plain text data values are replaced with references.

In some embodiments, the process 300 may include determining 306 whether the operational clause pertains to lookup within a reference data set. For example, in response to identifying an operational clause within a request for querying data at step 304, inspection may further include determining 306 whether the identified operational clause indicates a data field associated with a set of entries (e.g., records) in the first database populated with respective references in a set of references. As noted above, the set of references within the data field may be indicative of locations of respective plain text values stored within the second database that correspond to respective entries in the set of entries within the first database. Entries in a column may be a reference data set or a subset of a reference data set, and the records, or rows, may include fields corresponding to the columns within which respective ones of the entries are associated. The instructions for performing a query that includes an operational clause may indicate that lookup (or searching) for plain text values is to occur within one or more columns (e.g., fields) that includes references (e.g., instead of plain text values). As the references are indicative of locations for respective plain text values and not the plain text values themselves, determining which records or entries having plain text values satisfying the operational clause may be require examination of the respective plain text values within the second database. In turn, an entry within the first database may be obtained based on the respective reference, and the reference may optionally be replaced with the plain text value (e.g., in accordance with permissions or policy governing the data field).

In some embodiments, the process 300 may proceed if the inspection determines that instructions for a query satisfy the following conditions:
 a. the instructions contain an operational clause, and
 b. the instructions indicate an operational clause pertains to lookup (or searching) within a column (e.g., data field of records) that includes references.

In some example embodiments, which columns (or fields or type of values) contain references may be maintained in a key-value or lookup table. A database driver, external function system, or translator (or other component) may determine that execution of the query involves a reference data set based on the matching of a column (or field name or type of value) as a key to a value indicative of the inclusion of references (e.g., a reference data set replacing a plain text data set). Similarly, a lookup table may indicate that a column (or field name or type of value) includes references. In some embodiments, where both (a) and (b) are determined to be true, the process 300 may proceed. Some embodiments may utilize a tiered decision approach like that described above, e.g., by determining if (a), then (b), such that if (a) is false then (b) need not be determined. In some cases, a tiered determination process may mitigate one or more lookup operations within the lookup table by filtering some instructions at (a). For example, (a) may be determined to be true when certain instructions, such as a WHERE clause, include a wildcard operator and not for a single value.

In some embodiments, the process 300 includes a translation (or transformation) 308 of instructions for performing a query from a schema which would be compatible with a relational database storing plain text data to one which will be successful in a relational database storing references to plain text data maintained in another database. For example, the operational clause may be translated from a schema configured to identify plain text values satisfying the specified criteria within the data field into translated instructions for querying within the set of references in the first database. The translated instructions may include a reference or subset of references (that correspond to a location or locations of respective ones of the plain text values in the second database that satisfy the specified criteria of operational clause) by which corresponding entries or records may be identified and returned. In other words, at least some instructions for performing a query may be translated from operations for lookup within a plain text data set into operations for performing lookup within a reference data set to obtain corresponding entries.

For example, continuing with the above-described examples, where plain text data entries within a relational database are replaced with references, such as 'abc123' for 'apple' and 'bca321' for 'people', for a simple search criteria, such as col1='apple', embodiments may translate that plain text query directed to the relational database into one that will successfully match to the 'abc123' reference. Similarly, for col1='people,' embodiments may translate that plain text query directed to the relational database into one that will successfully match to the 'bca321' reference. Some embodiments may send the string 'apple' to a translator (e.g., like translator 223) and receive in response a reference value for that data (in some cases, engaging a scatter process to return a distinct reference for distinct data), and replace the plain text terms in the query (e.g., 'apple' in this case) with the returned reference 'abc123'. As a result, the instructions for performing the query may now be expressed as col1='abc123.' This transformed query may be sent to the storage environment 220 including a relational database 225, like a lower-trust database, and may be a successful query on the lower-trust database. For instance, embodiments may seek all recipe titles (that are in plain text, e.g., lower-trust) in column 2 that have as a primary ingredient (that are references, e.g., higher-trust) "apple" in column 1. Embodiments may return a correct list of responsive column 2 values without de-scattering and replacing every reference value for every row in column 1. In some embodiments, each distinct plain text data in the set maps to a distinct reference set value (or set of values of manageable size given available computing resources).

Other example translations can increase in complexity. For example, an operational clause specifying a wildcard operator may implicate one or more plain text values, like a subset of plain text values within the set of plain text values for a data field. As the plain text values within the data field in of the relational database are replaced with references, a translation may identify a corresponding subset of references within the set of references. In other words, the subset of references includes references of respective plain text values of the subset of plain text values which satisfy criteria specified by the wildcard operator. Here, the operational clause specifying a wildcard operator which one or more plain text values may satisfy is translated from the schema configured to determine which plain text values satisfy specified criteria into translated instructions by which respective references which replaced those plain text values may be queried. Example instructions may comprise a reference or subset of references that correspond to a location or locations of respective ones of the plain text values in the second database that satisfy the specified criteria of operational clause. In turn, a corresponding set of records (or entries) may be returned, and (optionally, e.g., based on permissions or policy), the corresponding set of entries may be returned with the plain text values (e.g., by replacing a given reference with a corresponding plain text value obtained from the higher-trust database based on the given reference, such as by obtaining the plain text value from a location indicated by the given reference).

An example of an operational clause comprising a wildcard operator, like a "%<string>", may match to plain text values based on a lookup to identify plain text values ending with <string> regardless of one or more alphanumeric characters prior to the specified alphanumeric characters of <string>. Continuing with an example like those described above, a lookup in column 1 of % ple (e.g., having a <string>="ple" should return words (or alphanumeric values) ending in "ple", such as "apple" and "people." As these plain text values are replaced with references, translated instructions to lookup references of plain text values which satisfy % ple within example column 1 should match to the 'abc123' and 'bca321' references to return those corresponding records. In an example case of instructions col2='%1234', where "%" indicates a wildcard operator that can be satisfied by any of a variety of characters in a set of more than 1, instructions indicate a lookup for records having values in col2 that end with '1234' in the plain text data set, but those records may have references for values in col2. Embodiments may translate 308 those instructions for lookup within the plain text data set into instructions for lookup within the reference set.

Some embodiments of a database driver may send the instructions for the query, e.g., '%1234' (and optionally an indicator of col2), to be processed externally (e.g., to a translator 223 or other component). In some cases, embodiments of a database driver or other component may transmit a request to an API configured to return translated instructions. Other embodiments of a database driver or component may include the logic by which instructions may be translated. In some embodiments, various hashing techniques may be utilized to generate meta-information about the plain text and data-stores, examples of which may include but are not limited to Bloom filters, Cuckoo filters, hashing-based data structures (e.g., which may include one or more Bloom or Cuckoo filters or other filter operating by similar principles), or other search data structures. A hash-based data structure or other search data structures may associate meta-information about plain text values with references and be operable to return references (or potential references) based on query instructions. For example, query instructions (e.g., '1234' or a portion thereof) may be processed according to a schema with which the meta-information about the plain text values was generated for querying a hash-based search data structure. In some cases, at least some portion of the plain text in the query instructions (e.g., '1234' or portion thereof) may be hashed (e.g., at least once, and oftentimes by different hashing functions or a series of hashing functions) to query the hash-based data structure, such as one or more hash tables of the data structure, and associations stored within the data structure between one or more hashes and references may be operable to return one or more potential references as including the queried element. Meta-information, for example, may be generated based on the plain text values (e.g., based on respective values of different plain text items in a set and optionally their type or other properties and which queries may be expected) that are associated with respective references, and the meta-information may be hashed for generating a hash-based data structure which may include but is not limited to one or more Bloom filters or Cuckoo filters or other hash-table based search structures or other search data structure by which references (or potential references) may be returned in response to a query. In some examples, the one or more hashes of the plain text value for searching may implicate one or more locations within a hash table, which may be operable individually or in combination to return one or more potential references.

A request to a hash-based data structure or other search data structure may be determined based on terms, instructions, or arguments of a query (e.g., "%1234") to translate the query into the reference space. As an example, a request (e.g., query) to a hash-based data structure may return one or more references in the reference space (which may be potential references), like keys, which are mapped to the queried value. Where there exists the possibility of false positives (e.g., like in some configurations based on Bloom Filters or Cuckoo filters, and other hash-based data structures), returned references may be verified, such as by querying the second database to determine whether a potential reference is associated with a valid plaintext value (e.g., the corresponding plain text value satisfies the query which is being translated to the reference space) or a false positive (e.g., the corresponding plain text value does not satisfy the query). Some configurations may return negative results without a false positive rate. As an example, if last names are replaced by references, a query for C %' within a last name data field may be processed by determining one or more hashes of 'C' in accordance with a meta-information schema for the data field and querying a hash-based data structure or other search data structure configured to return potential references that are implicated by the determined hashes (e.g., of 'C' that implicate hashes generated based on plain text value that begin with 'C' and with which corresponding references are associated).

In some cases, such as where references are mapped for a data type across multiple data fields, an operation may determine which ones of the references occur within the data field being queried. One or more of the returned references may be validated, such as to determine whether the plain text value associated with the reference satisfies the query for C %'. In some cases, other queries may be processed based on a single meta-information schema. For example, a query for the first two letters of a last name (e.g., 'Co %') may be processed in accordance with the above principles, such as by returning potential references for 'C' and determining which ones of the references correspond to plain text values beginning with 'Co'. Here, the plaintext values of returned references may satisfy C %', but not all satisfy 'Co %', and the latter is determined by verification. Or, alternatively, if meta-information is stored for the first three characters, a query for 'Co %' may be processed into a set of requests to hash-based data structure or other search data structure, such as a plurality of requests based on 'Co', like Co<N> where N is iterated through a set of possible values according to a schema (e.g., A-Z for last names) to return potential references which may then be verified. Here, a process may generate 26 requests (e.g., the size of A-Z) from 'Co<A>' through 'Co<Z>', which may take less time than verifying a potentially much larger number of references returned by a single request for references based on 'C'. In some cases, a sequence of hash-based data structures may be queried based on the length of string and one or more characters selected from the string.

Rules for requesting references from a hash-based data structure or other search data structure may be applied based on a data field being queried and properties of the query term, like length, to tradeoff number of requests and number of verifications of plaintext values associated with returned references. The above example yields 26 requests based on the number of letters in the alphabet (but in practice may including other possible characters like hyphens), a similar set of requests for varying one numerical digit would yield 10 requests (e.g., 0-9), and iterating through both for alphanumeric possibilities might yield 36 requests (e.g., 0, . . . , 9, A, . . . , Z) plus any additional characters. Here, the number of requests performed to return a smaller set of references may take less time to process than verifying each reference indicated as having a value beginning with 'C' to determine whether the associated plaintext value satisfies 'Co %'. If two instances of value possibilities are iterated through, e.g., meta-information is stored for the first four characters, the plurality of requests in the above example may take the form Co<N,N> for all combinations of NN. An increase of instances of value possibilities can thus potentially cause an exponential increase in number of requests generated, which for some threshold increase in number of instances of value possibilities for a given size of value possibilities (e.g., size 36 for example <0-Z> alpha numeric value possibilities) may take longer than verification of plaintext values associated with references return for 'C'. In some embodiments, a number of references returned for a request term to the hash-based data structure or other search data structure may be determined or tracked and time (e.g., latency) to verify vs time (e.g., latency) to request may be determined or tracked during operation of the database system to trigger or enforce rules that optimize the tradeoff between number of requests and number of verifications. For example, exponential increase in requests to a search data structure may be favored (e.g., due to the low latency of such search data structures relative to other data stores, e.g., by which values may be verified) in at least some instances based on whether a relatively large number of higher latency reads of a higher security data store may occur (e.g., based on number of or estimated number of verifications to perform).

In accordance with the above techniques, in some example embodiments, a list of potential reference set values that could satisfy a plain text set search of '%1234' are complied. After a set of potential references values is found (and which may be verified in some embodiments), the references may be returned, or a modified query including the set of reference values may be returned (which in some cases may be potential references in instances where they are not verified prior to being returned). In either instance, a modified query is structured to include (potential) references (e.g., the values, like hash pointers or other values indicative of locations, corresponding to the respective references) in the set as alternative terms. In some cases, such as where meta-information for references in multiple different data fields is utilized in a hash-based data structure or search data structure, some of the potential references (which may correspond to plaintext values which satisfy the query terms, and such verification may occur in some cases prior to returning those potential references) may occur in other data fields. While this may result in some overhead, those references need not influence the results of the lookup within the data field (e.g., because they are not found). For example, a query including a % operator, like col2=%<string>, where string implicates a set of potential references values 'abc234', 'abc567', 'abc789', may be translated to col2 IN ('abc234', 'abc567', 'abc789'). In turn, in col2, where any one of 'abc234', 'abc567', 'abc789' as potential reference set values match to a reference data set value in the column, the corresponding row (or record) may be matched (and optionally returned or otherwise utilized to return results), and those retuned reference data set values correspond to plain text set values which match to the string of the '%<string>' query. In some embodiments, verification of the plaintext values corresponding to the matched references may occur in this phase, e.g., rather than in a prior step for determining potential references. In some embodiments, the plaintext values corresponding to the matched references need not be verified, e.g., because they are verified prior to the lookup, requests to and one or more search data structures are configured such that false positives (e.g., which could also be found within the given data field such as by segmentation of a reference set of a data field across different search data structures, or otherwise) are not returned.

In accordance with the one or more techniques of the various embodiments described above, the number of references which are processed to obtain corresponding plain text values from a second data structure, like a higher security data structure with higher latency in the request-response path relative to lower security data structures and search data structures, may be reduced (e.g., significantly) with respect to a process which naively obtains (e.g., all of) the plain text values corresponding to references within a column (or data field) to then determine which ones of the records (e.g., rows or entries) satisfy an operational clause (e.g., as would occur in a traditional lookup within a data field including lower security values). Lookup within a data field including lower security values, however, occurs without the latency penalty to obtain the plain text values corresponding to references. As such, implementation of techniques to translate operational clauses based on their query terms into the reference space, such as by utilizing hash-based search data structures or other search data structures to return a set of references (or potential references), reduces the number of high-latency retrievals of plain text values corresponding to references from the second data structure for verification or to return plaintext values themselves (e.g., based on permissions). In some embodiments, such as where the requesting entity is permissioned to view the plain text values of the references and is requesting to view those plain text values (e.g., rather than merely obtaining entries or records based on them, which may be subject to lower permissions), verification may be implemented upon obtaining corresponding plain text values rather than (e.g., earlier) to return of references. Some embodiments may omit verification for at least some use cases, such as where returned records or entries are subsequently selected to operate on or otherwise utilized (e.g., by a human operator) and return of a false positive for a small subset of possible query terms is preferable to even a reduced number (e.g., any) higher latency reads based on references. Some embodiments of a database driver, translator, or API may provide the option to specify such a preference for certain clients, applications, queries, etc. at the administrative level or the option may be selected at the user level, such as by inclusion with a request to an API or translator or database driver, or settings associated with a database driver or other component.

In some embodiments of the process 300, after translating the operational clause of a query into modified instructions for the query, the query (e.g., including translated instructions) may be executed 310. For example, the modified instructions may be utilized to execute the query within a relational database 225, like a lower-trust database. As the translated query instructions capture a reference or subset of references that correspond to plain text data set values that satisfy the operational clause of the pre-translated query within another database, such as in the secure distributed storage 227, equivalent results are returned based on the reference data set within the relational database 225 that include references to corresponding plain text data (e.g., without retrieving plaint text data corresponding to each reference from the secure distributed storage 227 to determine results).

While some of the above sections disclose various sophisticated techniques, those sections should not be read to disclaim embodiments that may change col2='%1234' to SELECT * from col2, and then, after translating all reference set values to plain text set, iterate though the plain text values to match those values (e.g., where value="<string>1234") to the original query. This can add latency and large memory requirements, but may be implemented where such tradeoffs are appropriate.

As outlined above, embodiments of processing simple and complex WHERE clause queries in SQL databases with reference values to plain text values within another database may be implemented by one or more components of the described database architectures. For example, aspects of the disclosed techniques may be implemented within database drivers, security drivers, translators, or application programming interfaces (e.g., of an external function system 210). In some examples, the external functions system 210 may implement access controls using simple or complex clauses to enforce access to only certain subsets of data, even in instances where plaintext data values are replaced by reference values. For example, the above-described process may enable the external function system to limit a selection to where credit card number=4%, such as to enforce a selection from within only records corresponding to VISA cards, or the like, by query modification. In some example embodiments, the external function system 210 may modify a query to append a clause of where credit card number=4%, and other components (e.g., the database driver or translator 223) may effect further query modification to perform the lookup, or the external function system 210 may include a translation component, or rules, to generate a modified query that includes a translation of where credit card number=4%.

Such example components may perform some or all aspects of disclosed processes, or may perform one or more roles in disclosed processes, which may include, but are not limited to example operations such as receiving a request for querying data within a database arrangement including at least a first database (e.g., like a lower-trust database) having a first data structure (e.g., such as a relational database) and a second database (e.g., like a higher trust database) having a second data structure (e.g., like a blockchain-based data structure) different from the first data structure, inspecting the request to identify whether instructions for querying data in the first database include an operational clause (e.g., like a WHERE clause) specifying criteria satisfied by plain text values; in response to identifying an operational clause, determining whether the identified operational clause indicates a data field associated with a set of entries in the first database populated with respective references (e.g., values of the references) in a set of references (e.g., like a set of pointers, such as cryptograph hash pointers), the set of references indicative of locations of respective plain text values stored within the second database that correspond to respective entries in the set of entries within the first database; translating the operational clause from a schema configured to identify plain text values satisfying the specified criteria within the data field into translated instructions for querying within the set of references in the first database, the translated instructions comprising a reference or subset of references that correspond to a location or locations of respective ones of the plain text values in the second database that satisfy the specified criteria of operational clause; and querying within the first database to retrieve an entry or a set of entries having the reference or a reference in the subset of references in the data field.

Figure 4:
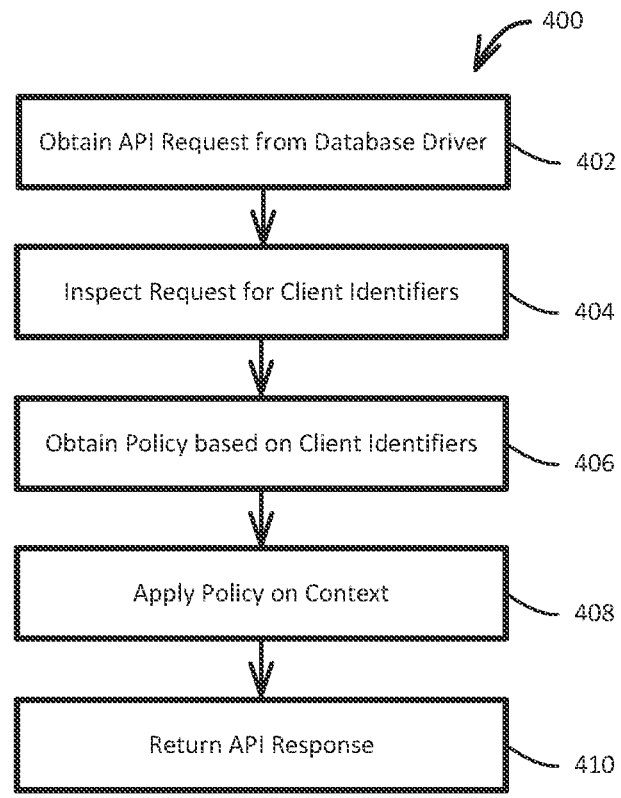
FIG. 4 illustrates an example process for implementing external functions responsive to data access events for a database arrangement in accordance with some example embodiments.

FIG. 4 illustrates an example process 400 for implementing external functions responsive to data access events for a database arrangement in accordance with one or more of the above-described embodiments. In some embodiments, the process 400 is called responsive to a data access event, such as detected by a database driver (which may include a security driver in some examples), upon connection attempt to, request attempt to, or retrieval of data from a database arrangement of a storage environment. For example, a driver (or other component as described above) may obtain a request to connect to a database arrangement (e.g., onConnection event), receive requests for querying data (e.g., onQuery event) within the database arrangement, and receive data (e.g., onRow even) from the database arrangement responsive to the querying. In some embodiments, a driver of a client computing environment is configured to, in response to onConnection, onQuery, onRow, or other events, perform a call to an API, like a RESTful API, to effectuate an external function for respective triggering events.

Embodiments of the process 400 may be performed by an external function system, which may be implemented within a client computing environment, server, or as a proxy (e.g., proxy server) of a storage environment. The process 400 includes obtaining an API request from a database driver 402. For example, an external function system implementing process 400 may receive an API call 402 from a database driver responsive to detection of a triggering event by the database driver. In some embodiments, the database driver may request configuration upon boot from the external function system (or a remote server) to obtain instructions by which the database driver identifies events to trigger an external functional call. The API request obtained 402 by the external function system from the database driver may contain the information pertinent to the event for which the database driver is making the request. For example, the API request may include a connection string, a query for submission to a storage environment, or data obtained from the storage environment.

In an operation 404, the API request may be inspected for client identifiers. For example, the database driver may report information about the client computing environment within which it executes to the external function system. For example, a request for an onConnection event may include a connection string that includes asserted credentials by the application for accessing a storage environment. Additionally, API requests may include additional identifiers, such as active directory information or computer name or user name information corresponding to the client computing environment reported by the database driver. For example, onQuery and onRow events (and onConnection events) may include one or more identifiers like those described above, or other contextual information, which may be reported by the database driver for the client computing environment or determined based on the request, like a location of the client, or other information. The external function system may inspect requests for one or more client identifiers or other identifiers associated with received API requests for identification of a policy.

In an operation 406, a policy may be obtained based on one or more identifiers associated with an obtained request. For example, the external function system may match one or more identifiers to stored identifiers, such as identify an applicable policy to be applied to data access for that client. If one or more reported identifiers do not conform or match to those expected by the external function system, the external function system may reject the request, or return a result that cause the database driver to not perform an action indicated by the API request. For example, the database driver may not connect to database, not act on a query (e.g., not submit a query to a database) or not return data received from a database to an application. The above actions, among others, may also be determined responsive to rules of a policy, as described below.

In an operation 408, an obtained policy may be applied to an API request, such as based on the context of the API request. For example, onConnection, onQuery, and onRow may each correspond to an example context, and may be identifiable based on information included in an API request. In some examples, an API request may specify a specific method, but such operation need not be required. For example, requests corresponding to onConnection events may include a connection string, and rules of an obtained policy may be applied based on client identifiers and the connection string. For example, the external function system may request multi-factor authentication prior to authorization of a connection (either through the external function system, e.g., as a proxy, or returning a result to a database driver that authorizes the connection). In some examples, the external function system may obtain credentials for access of a storage environment that differ than those included by the database driver, modify a connection string, and return a modified connection string to a database driver by an API response 410. In some examples, the external function system may be a proxy server and determine whether to provide a connection to the database driver, which may include returning a modified connection string by an API response 410 that causes a database driver to request a connection to the external function system. In some examples, a connection string may be modified to include additional information, like a comment, which may include one or more client identifiers or multi-factor authentication results or other information that is received upon connection request using the connection string by a database driver. Thus, for example, a storage environment may store in an audit log specific information about a user or client that requested access.

In some embodiments, an API request may include a query for submission to a storage environment, like a SQL query or other request to look for data in a relational database. In some cases, a query or lookup request, as issued by an application and conveyed to the external function system by the database driver, may have a schema for querying plain text data. For example, an application may issue a query in the schema for querying a first database with plain text data, like a relational database. In some embodiments, one or more aspects of request including a query or lookup request may be modified prior to being serviced by the storage environment. For example, the external system may determine whether one or more modifications of a query should be taken based on rules of a policy and the client identifier information. For example, a client identifier, like a user name, or user group, or computer name, may trigger a rule of a policy applied by the external function system. In some examples, a rule of a policy may cause a modification of a query to limit return of data to within a subset of data (e.g., rather an among all data). These modifications may be applied to fields containing plan text values with expressive functions in a schema for querying a database. For example, the rule may specify query logic for modifying a query to limit selection of data based on values of records within a field. In some embodiments, a field may include reference values, rather than the plaintext values. The external function system, in some embodiments, may participate in a process 300 like that described above to determine modifications of a query where a rule specifies a limiting of selection of data in a first database within a field containing references to higher-security values which are stored in a second database. The external function system may return an API response 410 a database driver that includes a modified query, and may, as described above, append client identifier information to the query for logging by the storage environment upon receipt of the query. In some examples, a policy may specify whether a user is not permitted to run certain types of queries, or queries for too large or a data set, or too many queries within a short amount of time (e.g., rate limiting), among other functions to apply based on client identifiers.

In some embodiments, an API request may include data returned to a database driver from a storage environment, like one or more rows of data from records obtained from the storage environment. Some embodiments may cause a database driver to generate an API request including obtained data prior to the providing of that data to an application (e.g., that requested the data). In some embodiments, the data indicated in an API request including data responsive to a query or lookup request may be modified prior to being provided to an application. For example, the external system may determine whether one or more modifications of the data should be taken based on rules of a policy and client identifier information. For example, a client identifier, like a user name, or user group, or computer name, may trigger a rule of a policy applied by the external function system to delete, mask, or hash data. In some cases, the rules may examine the data for values to delete, mask, or hash, regardless of field, or within certain fields. The resulting data, after modification, may be returned in an API request 410 to a database driver by the external function system.

Figure 5:
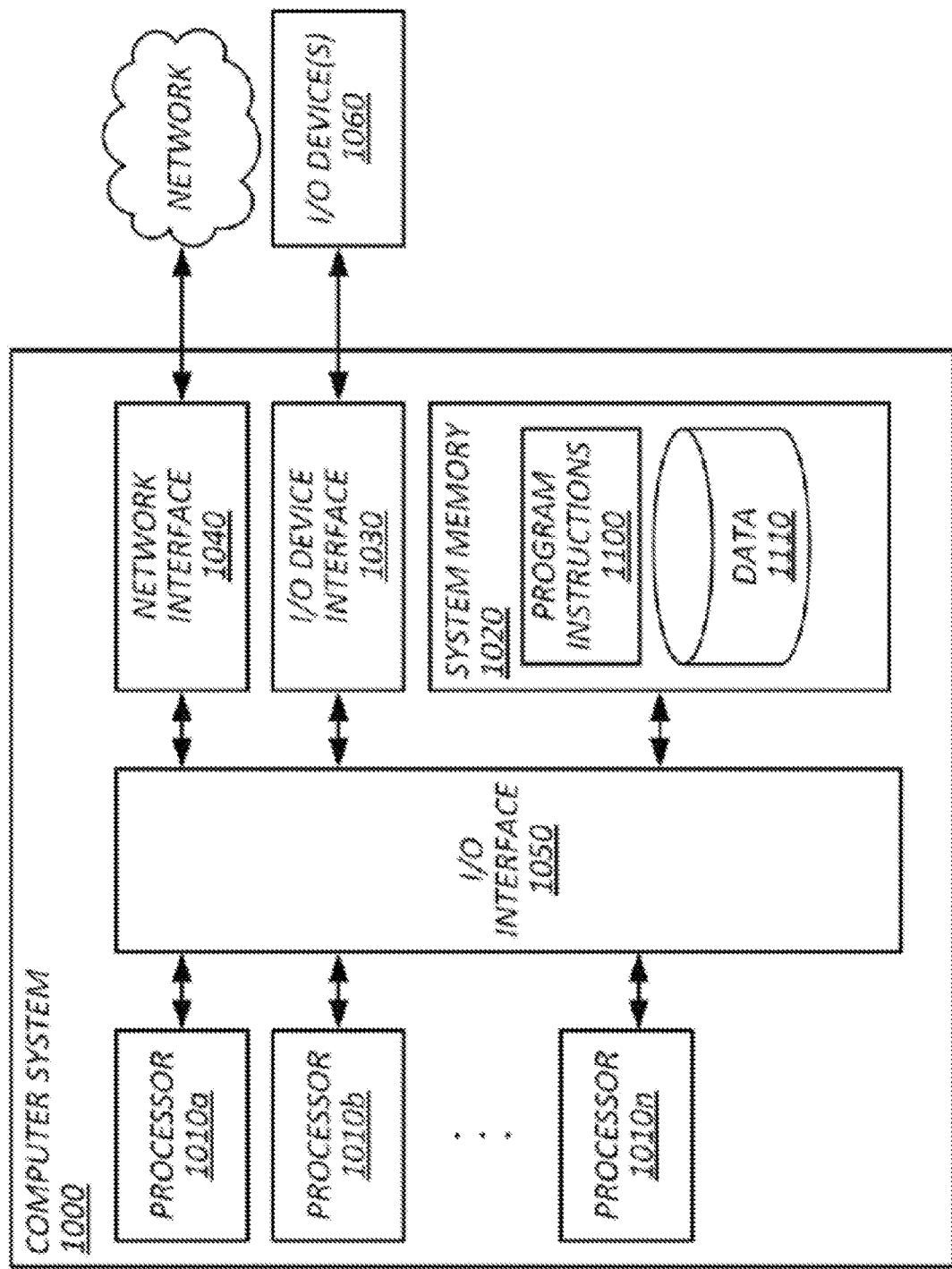
FIG. 5 illustrates an example of a computing device by which the present techniques may be implemented.

FIG. 5 is a diagram that illustrates an exemplary computing system 1000 by which embodiments of the present technique may be implemented. Various portions of systems and methods described herein, may include or be executed on one or more computer systems similar to computing system 1000. Further, processes and modules described herein may be executed by one or more processing systems similar to that of computing system 1000. In some embodiments, the computing system may include and extend upon the security features of a computing environment described in U.S. patent application Ser. No. 15/171,347, titled COMPUTER SECURITY AND USAGE-ANALYSIS SYSTEM, filed 2 Jun. 2016, the contents of which are hereby incorporated by reference.

In this patent, certain U.S. patents, U.S. patent applications, or other materials (e.g., articles) have been incorporated by reference. The text of such U.S. patents, U.S. patent applications, and other materials is, however, only incorporated by reference to the extent that no conflict exists between such material and the statements and drawings set forth herein. In the event of such conflict, the text of the present document governs.

Computing system 1000 may include one or more processors (e.g., processors 1010a-1010n) coupled to system memory 1020, an input/output I/O device interface 1030, and a network interface 1040 via an input/output (I/O) interface 1050. A processor may include a single processor or a plurality of processors (e.g., distributed processors). A processor may be any suitable processor capable of executing or otherwise performing instructions. A processor may include a central processing unit (CPU) that carries out program instructions to perform the arithmetical, logical, and input/output operations of computing system 1000. A processor may execute code (e.g., processor firmware, a protocol stack, a database management system, an operating system, or a combination thereof) that creates an execution environment for program instructions. A processor may include a programmable processor. A processor may include general or special purpose microprocessors. A processor may receive instructions and data from a memory (e.g., system memory 1020). Computing system 1000 may be a uni-processor system including one processor (e.g., processor 1010a), or a multi-processor system including any number of suitable processors (e.g., 1010a-1010n). Multiple processors may be employed to provide for parallel or sequential execution of one or more portions of the techniques described herein. Processes, such as logic flows, described herein may be performed by one or more programmable processors executing one or more computer programs to perform functions by operating on input data and generating corresponding output. Processes described herein may be performed by, and apparatus can also be implemented as, special purpose logic circuitry, e.g., an FPGA (field programmable gate array) or an ASIC (application specific integrated circuit). Computing system 1000 may include a plurality of computing devices (e.g., distributed computer systems) to implement various processing functions.

I/O device interface 1030 may provide an interface for connection of one or more I/O devices 1060 to computer system 1000. I/O devices may include devices that receive input (e.g., from a user) or output information (e.g., to a user). I/O devices 1060 may include, for example, graphical user interface presented on displays (e.g., a cathode ray tube (CRT) or liquid crystal display (LCD) monitor), pointing devices (e.g., a computer mouse or trackball), keyboards, keypads, touchpads, scanning devices, voice recognition devices, gesture recognition devices, printers, audio speakers, microphones, cameras, or the like. I/O devices 1060 may be connected to computer system 1000 through a wired or wireless connection. I/O devices 1060 may be connected to computer system 1000 from a remote location. I/O devices 1060 located on remote computer system, for example, may be connected to computer system 1000 via a network and network interface 1040.

Network interface 1040 may include a network adapter that provides for connection of computer system 1000 to a network. Network interface may 1040 may facilitate data exchange between computer system 1000 and other devices connected to the network. Network interface 1040 may support wired or wireless communication. The network may include an electronic communication network, such as the Internet, a local area network (LAN), a wide area network (WAN), a cellular communications network, or the like.

System memory 1020 may be configured to store program instructions 1100 or data 1110. Program instructions 1100 may be executable by a processor (e.g., one or more of processors 1010a-1010n) to implement one or more embodiments of the present techniques. Instructions 1100 may include modules of computer program instructions for implementing one or more techniques described herein with regard to various processing modules. Program instructions may include a computer program (which in certain forms is known as a program, software, software application, script, or code). A computer program may be written in a programming language, including compiled or interpreted languages, or declarative or procedural languages. A computer program may include a unit suitable for use in a computing environment, including as a stand-alone program, a module, a component, or a subroutine. A computer program may or may not correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program may be deployed to be executed on one or more computer processors located locally at one site or distributed across multiple remote sites and interconnected by a communication network.

System memory 1020 may include a tangible program carrier having program instructions stored thereon. A tangible program carrier may include a non-transitory computer readable storage medium. A non-transitory computer readable storage medium may include a machine readable storage device, a machine readable storage substrate, a memory device, or any combination thereof. Non-transitory computer readable storage medium may include non-volatile memory (e.g., flash memory, ROM, PROM, EPROM, EEPROM memory), volatile memory (e.g., random access memory (RAM), static random access memory (SRAM), synchronous dynamic RAM (SDRAM)), bulk storage memory (e.g., CD-ROM and/or DVD-ROM, hard-drives), or the like. System memory 1020 may include a non-transitory computer readable storage medium that may have program instructions stored thereon that are executable by a computer processor (e.g., one or more of processors 1010a-1010n) to cause the subject matter and the functional operations described herein. A memory (e.g., system memory 1020) may include a single memory device and/or a plurality of memory devices (e.g., distributed memory devices). Instructions or other program code to provide the functionality described herein may be stored on a tangible, non-transitory computer readable media. In some cases, the entire set of instructions may be stored concurrently on the media, or in some cases, different parts of the instructions may be stored on the same media at different times.

I/O interface 1050 may be configured to coordinate I/O traffic between processors 1010a-1010n, system memory 1020, network interface 1040, I/O devices 1060, and/or other peripheral devices. I/O interface 1050 may perform protocol, timing, or other data transformations to convert data signals from one component (e.g., system memory 1020) into a format suitable for use by another component (e.g., processors 1010a-1010n). I/O interface 1050 may include support for devices attached through various types of peripheral buses, such as a variant of the Peripheral Component Interconnect (PCI) bus standard or the Universal Serial Bus (USB) standard.

Embodiments of the techniques described herein may be implemented using a single instance of computer system 1000 or multiple computer systems 1000 configured to host different portions or instances of embodiments. Multiple computer systems 1000 may provide for parallel or sequential processing/execution of one or more portions of the techniques described herein.

Those skilled in the art will appreciate that computer system 1000 is merely illustrative and is not intended to limit the scope of the techniques described herein. Computer system 1000 may include any combination of devices or software that may perform or otherwise provide for the performance of the techniques described herein. For example, computer system 1000 may include or be a combination of a cloud-computing system, a data center, a server rack, a server, a virtual server, a desktop computer, a laptop computer, a tablet computer, a server device, a client device, a mobile telephone, a personal digital assistant (PDA), a mobile audio or video player, a game console, a vehicle-mounted computer, or a Global Positioning System (GPS), or the like. Computer system 1000 may also be connected to other devices that are not illustrated, or may operate as a stand-alone system. In addition, the functionality provided by the illustrated components may in some embodiments be combined in fewer components or distributed in additional components. Similarly, in some embodiments, the functionality of some of the illustrated components may not be provided or other additional functionality may be available.

Those skilled in the art will also appreciate that while various items are illustrated as being stored in memory or on storage while being used, these items or portions of them may be transferred between memory and other storage devices for purposes of memory management and data integrity. Alternatively, in other embodiments some or all of the software components may execute in memory on another device and communicate with the illustrated computer system via inter-computer communication. Some or all of the system components or data structures may also be stored (e.g., as instructions or structured data) on a computer-accessible medium or a portable article to be read by an appropriate drive, various examples of which are described above. In some embodiments, instructions stored on a computer-accessible medium separate from computer system 1000 may be transmitted to computer system 1000 via transmission media or signals such as electrical, electromagnetic, or digital signals, conveyed via a communication medium such as a network or a wireless link. Various embodiments may further include receiving, sending, or storing instructions or data implemented in accordance with the foregoing description upon a computer-accessible medium. Accordingly, the present techniques may be practiced with other computer system configurations.

In block diagrams, illustrated components are depicted as discrete functional blocks, but embodiments are not limited to systems in which the functionality described herein is organized as illustrated. The functionality provided by each of the components may be provided by software or hardware modules that are differently organized than is presently depicted, for example such software or hardware may be intermingled, conjoined, replicated, broken up, distributed (e.g. within a data center or geographically), or otherwise differently organized. The functionality described herein may be provided by one or more processors of one or more computers executing code stored on a tangible, non-transitory, machine readable medium. In some cases, notwithstanding use of the singular term "medium," the instructions may be distributed on different storage devices associated with different computing devices, for instance, with each computing device having a different subset of the instructions, an implementation consistent with usage of the singular term "medium" herein. In some cases, third party content delivery networks may host some or all of the information conveyed over networks, in which case, to the extent information (e.g., content) is said to be supplied or otherwise provided, the information may provided by sending instructions to retrieve that information from a content delivery network.

The reader should appreciate that the present application describes several independently useful techniques. Rather than separating those techniques into multiple isolated patent applications, applicants have grouped these techniques into a single document because their related subject matter lends itself to economies in the application process. But the distinct advantages and aspects of such techniques should not be conflated. In some cases, embodiments address all of the deficiencies noted herein, but it should be understood that the techniques are independently useful, and some embodiments address only a subset of such problems or offer other, unmentioned benefits that will be apparent to those of skill in the art reviewing the present disclosure. Due to costs constraints, some techniques disclosed herein may not be presently claimed and may be claimed in later filings, such as continuation applications or by amending the present claims. Similarly, due to space constraints, neither the Abstract nor the Summary of the Invention sections of the present document should be taken as containing a comprehensive listing of all such techniques or all aspects of such techniques.

It should be understood that the description and the figures are not intended to limit the present techniques to the particular form disclosed, but to the contrary, the intention is to cover all modifications, equivalents, and alternatives falling within the spirit and scope of the present techniques as defined by the appended claims. Further modifications and alternative embodiments of various aspects of the techniques will be apparent to those skilled in the art in view of this description. Accordingly, this description and the drawings are to be construed as illustrative only and are for the purpose of teaching those skilled in the art the general manner of carrying out the present techniques. It is to be understood that the forms of the present techniques shown and described herein are to be taken as examples of embodiments. Elements and materials may be substituted for those illustrated and described herein, parts and processes may be reversed or omitted, and certain features of the present techniques may be utilized independently, all as would be apparent to one skilled in the art after having the benefit of this description of the present techniques. Changes may be made in the elements described herein without departing from the spirit and scope of the present techniques as described in the following claims. Headings used herein are for organizational purposes only and are not meant to be used to limit the scope of the description.

As used throughout this application, the word "may" is used in a permissive sense (i.e., meaning having the potential to), rather than the mandatory sense (i.e., meaning must). The words "include", "including", and "includes" and the like mean including, but not limited to. As used throughout this application, the singular forms "a," "an," and "the" include plural referents unless the content explicitly indicates otherwise. The term "or" is, unless indicated otherwise, non-exclusive, i.e., encompassing both "and" and "or." Terms describing conditional relationships, e.g., "in response to X, Y," "upon X, Y,", "if X, Y," "when X, Y," and the like, encompass causal relationships in which the antecedent is a necessary causal condition, the antecedent is a sufficient causal condition, or the antecedent is a contributory causal condition of the consequent, e.g., "state X occurs upon condition Y obtaining" is generic to "X occurs solely upon Y" and "X occurs upon Y and Z." Such conditional relationships are not limited to consequences that instantly follow the antecedent obtaining, as some consequences may be delayed, and in conditional statements, antecedents are connected to their consequents, e.g., the antecedent is relevant to the likelihood of the consequent occurring. Statements in which a plurality of attributes or functions are mapped to a plurality of objects (e.g., one or more processors performing steps A, B, C, and D) encompasses both all such attributes or functions being mapped to all such objects and subsets of the attributes or functions being mapped to subsets of the attributes or functions (e.g., both all processors each performing steps A-D, and a case in which processor 1 performs step A, processor 2 performs step B and part of step C, and processor 3 performs part of step C and step D), unless otherwise indicated. Further, unless otherwise indicated, statements that one value or action is "based on" another condition or value encompass both instances in which the condition or value is the sole factor and instances in which the condition or value is one factor among a plurality of factors. Unless otherwise indicated, statements that "each" instance of some collection have some property should not be read to exclude cases where some otherwise identical or similar members of a larger collection do not have the property, i.e., each does not necessarily mean each and every. Limitations as to sequence of recited steps should not be read into the claims unless explicitly specified, e.g., with explicit language like "after performing X, performing Y," in contrast to statements that might be improperly argued to imply sequence limitations, like "performing X on items, performing Y on the X'ed items," used for purposes of making claims more readable rather than specifying sequence. Statements referring to "at least Z of A, B, and C," and the like (e.g., "at least Z of A, B, or C"), refer to at least Z of the listed categories (A, B, and C) and do not require at least Z units in each category. Unless specifically stated otherwise, as apparent from the discussion, it is appreciated that throughout this specification discussions utilizing terms such as "processing," "computing," "calculating," "determining" or the like refer to actions or processes of a specific apparatus, such as a special purpose computer or a similar special purpose electronic processing/computing device. Features described with reference to geometric constructs, like "parallel," "perpendicular/orthogonal," "square", "cylindrical," and the like, should be construed as encompassing items that substantially embody the properties of the geometric construct, e.g., reference to "parallel" surfaces encompasses substantially parallel surfaces. The permitted range of deviation from Platonic ideals of these geometric constructs is to be determined with reference to ranges in the specification, and where such ranges are not stated, with reference to industry norms in the field of use, and where such ranges are not defined, with reference to industry norms in the field of manufacturing of the designated feature, and where such ranges are not defined, features substantially embodying a geometric construct should be construed to include those features within 15% of the defining attributes of that geometric construct. The terms "first", "second", "third," "given" and so on, if used in the claims, are used to distinguish or otherwise identify, and not to show a sequential or numerical limitation.

Aspects of the present techniques will be better understood with reference to the following enumerated embodiments:

1. A tangible, non-transitory, machine-readable medium storing instructions that when executed by one or more processors effectuate operations comprising: receiving, by an external application programming interface (API), an API request from a database driver, the API request identifying client or user information and including information about an access event corresponding to a database arrangement, the database arrangement comprising at least a first database having a first data structure and a second database having a second data structure different from the first data structure; inspecting the API request to obtain one or more identifiers of a client or user matching a policy for controlling data access from the database arrangement by the client or user; modifying, responsive to one or more rules of the policy based on one or more of the identifiers, access event data for the database arrangement, wherein the modification comprises modifying a connection string for connecting to the database arrangement, a query for obtaining data from the database arrangement, or data returned by the database arrangement; and returning, by the external API, an API response to the database driver, the API response including the modified access event data.
2. The medium of embodiment 1, further comprising: providing, to the database driver upon boot of the database driver, instructions for generating the API request to the external API responsive to an access event in a set of access events, the set of access events comprising one or more of connections to the database arrangement, obtaining data from the database arrangement, or data returned by the database arrangement.
3. The medium of embodiment 2, wherein: the database driver generates the API request to the external API responsive to a request by an application to connect to the database arrangement, the API request comprising the connection string.
4. The medium of embodiment 2, wherein: the database driver generates the API request to the external API responsive to a request by an application to obtain data from the database arrangement, the API request comprising the query for obtaining data from the database arrangement.
5. The medium of embodiment 2, wherein: the database driver generates the API request to the external API responsive to obtaining data from the database arrangement to provide to an application that requested the obtained data, the API request comprising the data.
6. The medium of embodiment 1, wherein modifying a connection string for connecting to the database arrangement comprises: rewriting the connection string to cause the database driver to connect to the database arrangement through a proxy server.
7. The medium of embodiment 6, wherein: the external API is executed by the proxy server.
8. The medium of embodiment 1, wherein modifying a connection string for connecting to the database arrangement comprises: requesting authentication of a user indicated by the one or more identifiers of the client or the user via a different device; and authorizing the connection to the database arrangement based on an authentication result for the user.
9. The medium of embodiment 8, further comprising: appending one or more of the authentication result or identifiers of the client or the user to the connection string.
10. The medium of embodiment 1, wherein modifying a connection string for connecting to the database arrangement comprises: rewriting the connection string to connect to the database arrangement using an account associated with one or more of the identifiers of the client or the user.
11. The medium of embodiment 1, wherein modifying a query for obtaining data from the database arrangement comprises: identifying the one or more rules of the policy to apply to arguments of the query based on the one or more of the identifiers; and appending an argument to the query or modifying an argument of the query to force a lookup of data to occur within a subset of the data.
12. The medium of embodiment 11, wherein forcing the lookup of data to occur within the subset of the data comprises: limiting a selection of records to a subset of records comprising a value or portion of a value within a field identified by an applied rule of the policy.

13. The medium of embodiment 11, further comprising: appending, as a comment to the query, one or more of the identifiers of the client or the user, the modified query comprising the appended identifiers; and storing, in an audit log associated with the external API, at least the modified query.
14. The medium of embodiment 13, wherein: the database arrangement stores in an audit log associated with the database arrangement, queries received from the database driver, and validating a query received from the database driver comprises determining whether the query matches a modified query stored within the audit log associated with the external API.
15. The medium of embodiment 1, wherein modifying data returned by the database arrangement based on one or more rules of the policy comprises: identifying the one or more rules of the policy to apply to the data returned by the database arrangement based on the one or more of the identifiers; determining whether any values or fields of the data returned by the database arrangement match values or fields of the identified rules of the policy; and deleting, masking, or hashing one or more matching values or values within matching fields responsive to the identified rules of the policy.
16. A method, comprising: the operations of any one of embodiments 1-15.
17. A system, comprising: one or more processors; and memory storing instructions that when executed effectuate the operations of any one of embodiments 1-15.

What is claimed is:
1. A tangible, non-transitory, machine-readable medium storing instructions that when executed by one or more processors effectuate operations comprising:
receiving, by an external application programming interface (API), an API request from a database driver, the API request identifying client or user information and including information about an access event corresponding to a database arrangement, the database arrangement comprising at least a first database having a first data structure and a second database having a second data structure different from the first data structure;
inspecting the API request to obtain one or more identifiers of a client or user matching a policy for controlling data access from the database arrangement by the client or user;
modifying, responsive to one or more rules of the policy based on one or more of the identifiers, access event data for the database arrangement, wherein the modification comprises modifying a connection string for connecting to the database arrangement, a query for obtaining data from the database arrangement, or data returned by the database arrangement;
returning, by the external API, an API response to the database driver, the API response including the modified access event data; and
storing, in an audit log associated with the external API, at least the modified query, wherein the database arrangement:
stores in an audit log associated with the database arrangement queries received from the database driver, and
validates a query that is received from the database driver and that is stored in the audit log associated with the database arrangement by determining whether the query matches a modified query stored within the audit log associated with the external API.

2. The medium of claim 1, further comprising:
providing, to the database driver upon boot of the database driver, instructions for generating the API request to the external API responsive to an access event in a set of access events, the set of access events comprising one or more of connections to the database arrangement, obtaining data from the database arrangement, or data returned by the database arrangement.

3. The medium of claim 2, wherein:
the database driver generates the API request to the external API responsive to a request by an application to connect to the database arrangement, the API request comprising the connection string.

4. The medium of claim 2, wherein:
the database driver generates the API request to the external API responsive to a request by an application to obtain data from the database arrangement, the API request comprising the query for obtaining data from the database arrangement.

5. The medium of claim 2, wherein:
the database driver generates the API request to the external API responsive to obtaining data from the database arrangement to provide to an application that requested the obtained data, the API request comprising the data.

6. The medium of claim 1, wherein modifying the connection string for connecting to the database arrangement comprises:
rewriting the connection string to cause the database driver to connect to the database arrangement through a proxy server.

7. The medium of claim 6, wherein:
the external API is executed by the proxy server.

8. The medium of claim 1, wherein modifying the connection string for connecting to the database arrangement comprises:
requesting authentication of a user indicated by the one or more identifiers of the client or the user via a different device; and
authorizing the connection to the database arrangement based on an authentication result for the user.

9. The medium of claim 8, further comprising:
appending one or more of the authentication result or identifiers of the client or the user to the connection string.

10. The medium of claim 1, wherein modifying the connection string for connecting to the database arrangement comprises:
rewriting the connection string to connect to the database arrangement using an account associated with one or more of the identifiers of the client or the user.

11. The medium of claim 1, wherein modifying the query for obtaining data from the database arrangement comprises:
identifying the one or more rules of the policy to apply to arguments of the query based on the one or more of the identifiers; and
appending an argument to the query or modifying an argument of the query to force a lookup of data to occur within a subset of the data.

12. The medium of claim 11, wherein forcing the lookup of data to occur within the subset of the data comprises:
limiting a selection of records to a subset of records comprising a value or portion of a value within a field identified by an applied rule of the policy.

13. The medium of claim 11, further comprising:
appending, as a comment to the query, one or more of the identifiers of the client or the user, the modified query comprising the appended identifiers.

14. The medium of claim 1, wherein modifying data returned by the database arrangement based on one or more rules of the policy comprises:
identifying the one or more rules of the policy to apply to the data returned by the database arrangement based on the one or more of the identifiers;
determining whether any values or fields of the data, returned by the database arrangement, match values or fields of the identified rules of the policy; and
deleting, masking, or hashing one or more matching values or values within matching fields responsive to the identified rules of the policy.

15. A computer-implemented method, comprising:
receiving a request for configuration of a database driver upon boot of the database driver;
providing, to the database driver, instructions for generating an application programming interface (API) request to an external API responsive to an access event in a set of access events, wherein the database driver determines whether data access events corresponding to an application serviced by the database driver match an event in the set of access events, and in response to identifying a data access event that matches an access event in the set of access events, the database driver executes an external function call to the external API;
receiving, by the external API, an API request from the database driver, the API request identifying client or user information and including information about an access event corresponding to a database arrangement, the database arrangement comprising at least a first database having a first data structure and a second database having a second data structure different from the first data structure;
inspecting the API request to obtain one or more identifiers of a client or user matching a policy for controlling data access from the database arrangement by the client or user;
modifying, responsive to one or more rules of the policy based on one or more of the identifiers, access event data for the database arrangement, wherein the modification comprises modifying a connection string for connecting to the database arrangement, a query for obtaining data from the database arrangement, or data returned by the database arrangement; and
returning, by the external API, an API response to the database driver, the API response including the modified access event data.

16. The method of claim 15, wherein:
the database driver executes the external function call to the external API prior to connecting to the database arrangement, obtaining data from the database arrangement, or providing, to the application, data returned by the database arrangement.

17. A computer-implemented method, comprising:
receiving, by an external application programming interface (API), an API request from a database driver, the API request identifying client or user information and including information about an access event corresponding to a database arrangement, the database arrangement comprising at least a first database having a first data structure and a second database having a second data structure different from the first data structure;

inspecting the API request to obtain one or more identifiers of a client or user matching a policy for controlling data access from the database arrangement by the client or user;
modifying, responsive to one or more rules of the policy based on one or more of the identifiers, access event data for the database arrangement, wherein the modification comprises modifying a connection string for connecting to the database arrangement, a query for obtaining data from the database arrangement, or data returned by the database arrangement;
returning, by the external API, an API response to the database driver, the API response including the modified access event data; and
storing, in an audit log associated with the external API, at least the modified query, wherein the database arrangement:
 stores in an audit log associated with the database arrangement queries received from the database driver, and
 validates a query that is received from the database driver and that is stored in the audit log associated with the database arrangement by determining whether the query matches a modified query stored within the audit log associated with the external API.

18. The method of claim 17, further comprising:
providing, to the database driver upon boot of the database driver, instructions for generating the API request to the external API responsive to an access event in a set of access events, the set of access events comprising one or more of connections to the database arrangement, obtaining data from the database arrangement, or data returned by the database arrangement.

19. The method of claim 18, wherein:
the database driver generates the API request to the external API responsive to a request by an application to connect to the database arrangement, the API request comprising the connection string.

20. The method of claim 18, wherein:
the database driver generates the API request to the external API responsive to a request by an application to obtain data from the database arrangement, the API request comprising the query for obtaining data from the database arrangement.

21. The method of claim 18, wherein:
the database driver generates the API request to the external API responsive to obtaining data from the database arrangement to provide to an application that requested the obtained data, the API request comprising the data.

22. The method of claim 17, wherein modifying the connection string for connecting to the database arrangement comprises:
rewriting the connection string to cause the database driver to connect to the database arrangement through a proxy server.

23. The method of claim 22, wherein:
the external API is executed by the proxy server.

24. The method of claim 17, wherein modifying the connection string for connecting to the database arrangement comprises:
requesting authentication of a user indicated by the one or more identifiers of the client or the user via a different device; and
authorizing the connection to the database arrangement based on an authentication result for the user.

25. The method of claim 24, further comprising:
appending one or more of the authentication result or identifiers of the client or the user to the connection string.

26. The method of claim 17, wherein modifying the connection string for connecting to the database arrangement comprises:
rewriting the connection string to connect to the database arrangement using an account associated with one or more of the identifiers of the client or the user.

27. The method of claim 17, wherein modifying the query for obtaining data from the database arrangement comprises:
identifying the one or more rules of the policy to apply to arguments of the query based on the one or more of the identifiers; and
appending an argument to the query or modifying an argument of the query to force a lookup of data to occur within a subset of the data.

28. The method of claim 27, wherein forcing the lookup of data to occur within the subset of the data comprises:
limiting a selection of records to a subset of records comprising a value or portion of a value within a field identified by an applied rule of the policy.

29. The method of claim 27, further comprising:
appending, as a comment to the query, one or more of the identifiers of the client or the user, the modified query comprising the appended identifiers.

30. The method of claim 17, wherein modifying data returned by the database arrangement based on one or more rules of the policy comprises:
identifying the one or more rules of the policy to apply to the data returned by the database arrangement based on the one or more of the identifiers;
determining whether any values or fields of the data, returned by the database arrangement, match values or fields of the identified rules of the policy; and
deleting, masking, or hashing one or more matching values or values within matching fields responsive to the identified rules of the policy.

31. A tangible, non-transitory, machine-readable medium storing instructions that when executed by one or more processors effectuate operations comprising:
receiving a request for configuration of a database driver upon boot of the database driver;
providing, to the database driver, instructions for generating an application programming interface (API) request to an external API responsive to an access event in a set of access events, wherein the database driver determines whether data access events corresponding to an application serviced by the database driver match an event in the set of access events, and in response to identifying a data access event that matches an access event in the set of access events, the database driver executes an external function call to the external API;
receiving, by the external, an API request from the database driver, the API request identifying client or user information and including information about an access event corresponding to a database arrangement, the database arrangement comprising at least a first database having a first data structure and a second database having a second data structure different from the first data structure;
inspecting the API request to obtain one or more identifiers of a client or user matching a policy for controlling data access from the database arrangement by the client or user;

modifying, responsive to one or more rules of the policy based on one or more of the identifiers, access event data for the database arrangement, wherein the modification comprises modifying a connection string for connecting to the database arrangement, a query for obtaining data from the database arrangement, or data returned by the database arrangement; and returning, by the external API, an API response to the database driver, the API response including the modified access event data.

32. The medium of claim 31, wherein:

the database driver executes the external function call to the external API prior to connecting to the database arrangement, obtaining data from the database arrangement, or providing, to the application, data returned by the database arrangement.

\* \* \* \* \*